United States Patent [19]
Reetz et al.

[11] Patent Number: 5,925,463
[45] Date of Patent: Jul. 20, 1999

[54] ELECTROCHEMICAL REDUCTION OF METAL SALTS AS A METHOD OF PREPARING HIGHLY DISPERSED METAL COLLOIDS AND SUBSTRATE FIXED CLUSTERS BY ELECTROCHEMICAL REDUCTION OF METAL SALTS

[75] Inventors: Manfred T. Reetz; Wolfgang Helbig; Stefan Andreas Quaiser, all of Mülheim an der Ruhr, Germany

[73] Assignee: Studiengesellschaft Kohle mbH, Mulheim an der Ruhr

[21] Appl. No.: 08/768,513

[22] Filed: Dec. 18, 1996

Related U.S. Application Data

[62] Division of application No. 08/401,750, Mar. 9, 1995, Pat. No. 5,620,584.

[30] Foreign Application Priority Data

Mar. 14, 1994 [DE] Germany ................. P4408512
Dec. 6, 1994 [DE] Germany ................. P4443392

[51] Int. Cl.$^6$ ................. B32B 5/16; C25B 1/00; B22F 1/00
[52] U.S. Cl. ................. 428/402; 205/464; 419/23; 419/30; 419/61; 419/63; 419/65; 420/580; 420/590; 428/403; 428/328; 428/331
[58] Field of Search ................. 428/402, 403, 428/328, 331; 419/23, 30, 61, 63, 65; 106/217, 403; 420/590; 205/334, 464, 574, 587, 597, 602, 610

[56] References Cited

U.S. PATENT DOCUMENTS

| | | |
|---|---|---|
| 3,716,358 | 2/1973 | Oka ................. 72/255 |
| 4,871,790 | 10/1989 | Lamanna et al. ................. 523/333 |
| 5,137,709 | 8/1992 | Simon et al. ................. 424/1.1 |
| 5,147,841 | 9/1992 | Wilcoxon ................. 502/173 |
| 5,268,429 | 12/1993 | Simon et al. ................. 252/644 |
| 5,395,532 | 3/1995 | Chaiko ................. 210/638 |
| 5,421,989 | 6/1995 | Stamp et al. ................. 205/166 |
| 5,506,091 | 4/1996 | Suzuki et al. ................. 430/324 |
| 5,609,907 | 3/1997 | Natan ................. 427/2.12 |

FOREIGN PATENT DOCUMENTS

| | | |
|---|---|---|
| 4-2877 | 1/1992 | Japan . |
| 65795 | 11/1972 | Luxembourg . |

OTHER PUBLICATIONS

Chemical Abstracts, vol. 77, No. 2, Abstract No. 13054, (1972).
Chemical Abstracts, vol. 98, No. 18, Abstract No. 151794, (1982).
Costa et al., "De–Alkylation of Quaternary Ammonium with Co(I) Nucleophiles", *Tetrahedron Letters*, No. 22 (1972), pp. 2167–2169.
Lisichkin et al., "Ashes of Metals", Khim. Shk., (1), pp. 81–82, 1975.
Grant, et al., Grant & Hackh's Chemical Dictionary, 5th ed., p. 145, 1987.

*Primary Examiner*—Hoa T. Le
*Attorney, Agent, or Firm*—Sprung Kramer Schaefer & Briscoe

[57] ABSTRACT

The object of the invention is a method for the electrochemical preparation of metal colloids with particle sizes of less than 30 nm, characterized in that one or more metals of groups Ib, IIb, III, IV, V, VI, VIIb, VIII, lanthanoides, and/or actinoides of the periodic table are cathodically reduced in the presence of a stabilizer, optionally with a supporting electrolyte being added, in organic solvents or in solvent mixtures of organic solvents and/or water within a temperature range of between –78° C. and +120° C. to form metal colloidal solutions or redispersible metal colloid powders, optionally in the presence of inert substrates and/or soluble metal salts of the respective metals.

The invention further relates to soluble or redispersible colloids as well as application on substrates and immobilization thereof, in particular for the preparation of catalysts.

25 Claims, No Drawings

ELECTROCHEMICAL REDUCTION OF METAL SALTS AS A METHOD OF PREPARING HIGHLY DISPERSED METAL COLLOIDS AND SUBSTRATE FIXED CLUSTERS BY ELECTROCHEMICAL REDUCTION OF METAL SALTS

This application is a divisional of application Ser. No. 08/401,750, filed on Mar. 9, 1995, now U.S. Pat. No. 5,620,584.

The present invention pertains to an electrochemical method of preparing soluble metal colloids and substrate fixed metal clusters. The invention also includes electrochemical preparation of soluble bimetallic colloids and substrate fixed bimetallic clusters.

As is well-known, soluble or substrate fixed finely distributed metals, metal colloids and metal clusters are valuable catalysts in organic and inorganic chemistry as well as in electrochemistry (fuel cells) [G. Schmid, *Clusters and Colloids*, VCH, Weinheim 1994; J. P. Fackler, *Metal-Metal Bonds and Clusters in Chemistry and Catalysis*, Plenum Press, New York 1990; B. C. Gates, L. Guczi, H. Knözinger, *Metal Clusters in Catalysis*, Elsevier, Amsterdam, 1986; S. C. Davis, K. J. Klabunde, *Chem. Rev.* 82 (1982) 153]. This involves the reduction of metal salts by reducing agents, such as hydrogen, alcohol, formaldehyde, hydrazine, alkali metals, anthracene activated magnesium, or boron hydrides. The synthesis often employs stabilizers which prevent undesired formation of metal powders. These include ligands (e.g. phenanthroline derivatives), polymers (e.g. polyvinylpyrrolidone), and surface-active agents (e.g. tetraalkylammonium salts) [see for instance: G. Schmid, B. Morun, J. -O. *Malm, Angew. Chem.* 101 (1989) 772; *Angew. Chem., Int. Ed. Engl.* 28 (1989) 778; M. N. Vargaftik, V. P. Zagorodnikov, I. P. Stolarov, I. I. Moiseev, *J. Mol. Catal.* 53 (1989) 315; J. S. Bradley, J. M. Millar, E. W. Hill, *J. Am. Chem. Soc.* 113 (1991) 4016; F. Porta, F. Ragaini, S. Cenini, G. Scari, *Gazz. Chim. Ital.* 122 (1992) 361; H. Bönnemann, W. Brijoux, R. Brinkmann, E. Dinjus, T. Joussen, B. Korall, *Angew. Chem.* 103 (1991) 1344; *Angew. Chem., Int. Ed. Engl.* 30 (1991) 1312; M. Boutonnet, J. Kizling, P. Stenius, G. Maire, *Colloids Surf.* 5 (1982) 209; M. Boutonnet, J. Kizling, R. Touroude, G. Maire, P. Stenius, *Appl. Catal.* 20 (1986) 163; N. Toshima, T. Takashashi, H. Hirai, *Chem. Lett.* 1985 1245; K. Meguro, M. Toriyuka, K. Esumi, *Bull. Chem. Soc. Jpn.* 61 (1988) 341; N. Toshima, T. Takashashi, *Bull. Chem. Soc. Jpn.* 65 (1992) 400; J. Blum, Y. Sasson, A. Zoran, *J. Mol. Catal.* 11 (1981) 293; N. Satoh, K. Kimura, *Bull. Chem. Soc. Jpn.* 62 (1989) 1758]. Sometimes metal vaporization is used [G. Schmid, *Clusters and Colloids*, VCH, Weinheim 1994; J. P. Fackler, *Metal-Metal Bonds and Clusters in Chemistry and Catalysis*, Plenum Press, New York 1990; B. C. Gates, L. Guczi, H. Knözinger, *Metal Clusters in Catalysis*, Elsevier, Amsterdam, 1986; S. C. Davis, K. J. Klabunde, *Chem. Rev.* 82 (1982) 153]. Drawbacks of these methods are, inter alia, (1) the high costs of metal vaporization and of some reducing agents; (2) partial or undesired formation of metal powders; (3) tedious separation procedures for the purification of the metal clusters or colloids; (4) contamination by partial incorporation of reducing agents (e.g. hydrogen or boron); (5) lack or limitation of facilities for controlling the particle size. Specific and simple control of particle size while synthesis and isolation are simple would just be a large progress, however, all the more, since the catalytic properties of metal colloids and metal clusters depend on particle size [A. Duteil, R. Queau, B. Chaudret, R. Mazel, C. Roucau, J. S. Bradley, *Chem. Mater.* 5 (1993) 341].

Drawbacks of the above mentioned methods are, inter alia, the high costs of some reducing agents; tedious separation of by-products; impure products from undesired partial incorporation of reducing agents (e.g. hydrogen or boron); and/or lack or limitation of facilities for controlling the particle size.

It is known that in conventional metal powder production, electrochemical processes are also used wherein use is made either of anodic dissolution with subsequent reduction at the cathode or of reduction at the cathode of metal salts employed [N. Ibl, *Chem. Ing.-Techn.* 36 (1964) 601]. These methods are inexpensive and often clean with respect of the formation of by-products (R. Walker, A. R. B. Sanford, *Chem. Ind.* 1979, 642; R. Walter, *Chem. Ind.* 1980, 260). This involves the use of aqueous electrolytes which in most cases comprise sulfuric acid. Although metals and alloys of different morphologies can be prepared in this way, one drawback is the concomitant formation of metal hydrides through $H_2$ formation at the cathode which is frequently observed [N. Ibl, G. Gut, M. Weber, *Electrochim Acta* 18 (1973) 307]. The major drawback, however, is the fact that to date the preparation of soluble nanostructured colloids in the range of up to 30 nm has not been accomplished. Rather, deposition of metal powder in the form of large crystallites in the nm or $\mu$m range occurs as a rule.

The inventors of the present application have now developed a novel electrochemical process for the preparation of nanostructured metal clusters or colloids in a first embodiment, according to which an anode consisting of a metal sheet serves as the metal source [M. T. Reetz, W. Helbig, *J. Am. Chem. Soc.* 116 (1994) 7401]. Surprisingly, it has now been found that electrochemical synthesis of soluble metal colloids can be achieved by operating in an inert organic, aprotic solvent, with surface-active colloid stabilizers being added as the supporting electrolyte which on one hand will prevent plating of the metal and on the other hand will protect or stabilize the rather small metal nuclei in the cluster stage. A metal sheet serves as the anode to be dissolved and a metal or glassy carbon electrode serves as the cathode (scheme 1). After dissolution at the anode, the released metal salts are reduced again at the cathode, with tetraalkylammonium salts serving as stabilizers (scheme 1). Organic solvents are employed.

Scheme 1

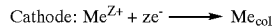

$Me_{bulk}$ = metal sheet
$Me^{z+}$ = oxidized metal in the form of an intermediate salt
$Me_{col}$ = metal colloid As the supporting electrolyte and at the same time as a stabilizer for the colloids, quarternary ammonium or phosphonium salts $R^1R^2R^3R^4N^+X^-$ and $R^1R^2R^3R^4P^+X^-$, respectively, are suitable. A wide variety of combinations of $R^1$, $R^2$, $R^3$ and $R^4$ are possible. Examples include the symmetrical tetraalkylammonium salts with $R^1=R^2=R^3=R^4=$n-butyl or n-octyl, the mixed tetraalkylammonium salts with $R^1=R^2=R^3=$methyl and $R^4=$cetyl, or chiral tetraalkylammonium salts having four different residues. Aryltrialkylammonium salts may also be used. Suitable counter ions include various anions, e.g. halogenides ($Cl^-$, $Br^-$, $I^-$), hexafluorophosphate ($PF_6^-$), carboxylates $R'CO_2^-$ ($R'$=alkyl, aryl), or sulfonates $R''SO_3^-$ ($R''$=alkyl, aryl). A similar variety of phosphonium salts may be used, including tetraarylphosphonium salts, such as tetraphenylphosphonium bromide. Preferably, tetrabutylammonium chloride, bromide or hexafluorophosphate, tetraoctylammonium bromide, or tributylhexadecylphosphonium bromide are employed. As the metals, in particular transition metals, for example Fe, Co, Ni, Pd, Pt, Ir, Rh, Cu, Ag, or Au, are used. Suitable solvents are aprotic organic solvents, such as tetrahydrofuran (THF), toluene, acetonitrile (ACN), or mixtures thereof. The temperature in the electrolytic cell may be in the range between $-78°$ C. and $+120°$ C., preferably 15–30° C. or room temperature.

In this way, metal colloids of various metals and metal alloys having various sizes and being stabilized by quarternary ammonium or phosphonium salts can be synthesized. The size of the metal colloids is determined by varying the current density which immediately affects the reduction potential of the cathode. The higher the overvoltage, which is defined as the deviation of the reduction potential from the equilibrium potential, the smaller becomes the maximum size of the metal nuclei in the electrolytic boundary layer. These nuclei are trapped which is achieved by the fact that the surface-active agents used as supporting electrolytes form a protective shell around them and thus prevent further growth. Thus, the size of the metal colloids can be controlled. For instance, soluble Pd colloids stabilized by tetraoctylammonium bromide can be prepared with selected diameters of about 2 nm, 5 nm, or 10 nm, depending on thE current density applied, i.e. 3.4, 1 and 0.4 $mA/cm^2$, respectively, at the same concentration of the stabilizer.

This method has the advantage that the $R_4N^+X^-$ stabilized metal colloids are formed without notable by-products and hence are readily isolated, that controlling of the particle size by adjusting the current density and/or the overpotential is possible, and that immobilization of the colloids by fixing them on substrates can easily be performed. Some metal sheets are more expensive than the respective metal salts; some metal sheets, especially in the case of metals very resistant to oxidation, cannot be dissolved at all anodically or only poorly so. From the redox potentials of the metals which can be found in tables in the relevant literature [*Handbook of Chemistry and Physics*, CRC Press, Boca Raton, Fla. (USA), 1988], the latter behavior can be understood. Metals such as for instance Pt or Rh can be anodically dissolved only conditionally in the described medium according to scheme 1. However, dissolution is a precondition for the above embodiment to succeed.

Another embodiment of an electrochemical method has now been found according to which metal salts are used and are reduced at the cathode to form stabilized clusters in the nanometer range. The invention will be successful even if metal salts are used whose corresponding metal sheet is readily dissolved anodically.

For performing the metal colloid synthesis of the invention according to said further embodiment, metal salts $MX_n$ are used for electrochemical reduction, where quite different ligands X are suitable. In addition to halogenides (F, Cl, Br, I), mention may be made, in particular, of carboxylates $RCO_2^-$ (e.g. $R=CH_3$, $CF_3$, $C_2H_5$, $C_3H_7$, $C_4H_9$, $C_6H_5$) from simple carboxylic acids, from fatty acids (e.g. $R=C_{17}H_{35}$), and from chiral carboxylic acids [e.g. $R=CH(CH_3)C_6H_5$], of sulfonates $RSO_3^-$ (e.g. $R=CH_3$, $CF_3$, $CH_3C_6H_4$), and of acetylacetonates. The metals in the salts $MX_n$ may be main group elements, for instance Ga, In or Tl, as well as transition metals, for instance Fe, Co, Ni, Cu, Mo, Ru, Rh, Pd, Ag, Os, Pt, or Au. The above-mentioned ammonium or phosphonium salts serve as stabilizers for the colloids.

The above-mentioned organic solvents, such as for instance tetrahydrofuran (THF), toluene, propylene carbonate, acetonitrile (ACN), or mixtures thereof as well as mixtures of THF and $H_2O$ or of ACN and $H_2O$, serve as solvents. Mixtures of THF and alcohols, such as methanol or ethanol, or of ACN and alcohols may also be used. The temperature in the electrolytic cell may be within the above-mentioned range. As the anode and the cathode, inert electrode materials conventionally used in electrochemistry, e.g. Pt sheets or graphite, are selected.

Whereas the metal clusters with the above-mentioned stabilizing ammonium or phosphonium salts are soluble in organic solvents, water solubility is achieved by using ionic (cationic, anionic, zwitterionic) or non-ionic stabilizers which are readily soluble in water, optionally in the presence of a supporting electrolyte, such as e.g. lithium chloride, lithium acetate, or tetramethylammonium acetate. As cationic stabilizers, e.g. fully or partially esterified methyltri(hydroxyethyl)ammonium or -phosphonium salts as well as compounds of the type $R^1R^2R^3R^4N^+X^-$ or $R^1R^2R^3R^4P^+X^-$, with e.g. $R^1=(CH_2CH(OH)CH_2Cl)$, $R^{2-4}$=alkyl or aryl, are used. The anionic stabilizers include e.g. alkali metal salts of amino acid derivatives, such as e.g. sodium alkylamido-N-hydroxyethyl-glycinates or succinates. Suitable zwitterionic stabilizers include e.g. $(CH_3)_2N^+(C_{12}H_{25})CH_2CH_2CH_2SO_3^-$, $(CH_3)_2N^+(C_{12}H_{25})(CH_2)_xCO_2^-$ (x=1–3), or cocamidopropyl betaines. The group of the non-ionic stabilizers includes e.g. sugar derivatives, such as the commercially available substances of the TWEEN® group, modified cyclodextrines, polyglycosides, octanoyl-N-methylglucamide (MEGA-8), heptylglucopyranoside, poly(vinyl alcohol), and also polyoxyethylene alkyl ethers (BRIJ 35).

The present invention allows for the preparation of metal colloids according to the second embodiment of various metals having different sizes. The size of the metal colloids is determined by varying the current density which immediately affects the reduction potential of the cathode. The higher the overvoltage, which is defined as the deviation of the reduction potential from the equilibrium potential, the smaller the particle size.

For the preparation of bimetallic, trimetallic or multimetallic metal colloids, mixtures of two or more different metal salts are employed. Another method of preparing metal alloys in the form of stabilized colloids consists in using as electrodes a readily dissolved metal anode (sheets of e.g. Al, Ti, Sn, Ni, Cu, Pd, Ag, or Au) and an inert cathode (e.g. a platinum sheet) with addition of a metal salt $MX_n$ in a common solvent. The overall electrochemical process consists in that the anode is oxidatively dissolved to form a second metal salt, and that both metal salts are concurrently reduced at the cathod to form bimetallic stabilized colloids.

To characterize the metal colloids, conventional analytical methods are used, in particular transmission electron microscopy (TEM) and elemental analysis.

The embodiments according to the invention not only are inexpensive but also have the following advantages:
1) simple isolation of the metal colloids.
2) virtually no by-products.
3) no incorporation of foreign substances, such as e.g. hydrides or boron.
4) availability of metal colloids and bimetallic or multimetallic colloids that cannot be prepared by known electrochemical methods.

5) facility of simply controlling the particle size by adjustment of current density (or overpotential).
6) simple preparation of bimetallic colloids either by employing two different metal salts or by using a dissolving metal anode in combination with an added metal salt.
7) simple variation of solubility of the metal colloids by selecting the stabilizer (solubility ranging from pentane to water).
8) preparation of halogen-free catalysts which are important for catalysis.

The water soluble colloids prepared according to the invention can be used for the preparation of stable aqueous solutions with metal contents of above 4 mmol of metal per liter. Also possible is the preparation of aqueous solutions acidified with hydrochloric or sulfuric acid such as those used in electroplating and electroforming technology, e.g. in electroless plating [O. J. Murphy et al., "Electrochemistry in transition: From the $20^{th}$ to the $21^{st}$ century", Plenum Press, New York, 1992, page 39].

For the preparation of substrate fixed metal clusters, an undoped or doped substrate or carrier (e.g. $TiO_2$) is covered with a solution in $H_2O$ of a water soluble colloid, and the water is separated. An immobilized metal cluster is thus obtained in a simple manner. Alternatively, a slurry of the substrate in the electrolyte may be formed and electrolysis performed in the presence of the substrate. The metal clusters generated are fixed in situ on the substrate (e.g. coal). Further substrates that may be used are active charcoal, metal oxides (for instance $SiO_2$, $Al_2O_3$, MgO), or insoluble organic polymers (for example a polyamide, such as Kevlar®). The substrate may be doted with one or more metals, said dotation being performed by classical methods or by the electrochemical process described herein. The particle size may conveniently be determined by transmission electron micrographs. It has been found that the metal colloids according to the present invention can be coated in particular on the surface of inert substrates like usual catalyst supports without penetration into the body of the support bat providing in particular a monomolecular, bimolecular or multimolecular layer of the colloid with good adherence properties to the support surface.

The colloids prepared according to the invention can be used to apply metals in finely dispersed form on undoped or doped surfaces to form highly active heterogeneous catalysts. On the other hand, the colloids prepared according to the invention can be used as homogeneous catalysts. The substrate fixed metal clusters prepared according to the invention can be used as heterogeneous catalysts or as electrocatalysts in fuel cells. Thus, palladium colloids adsorbed on solid polymers or glasses serve as catalysts in electroless plating to metallize nonconductors. Another field of applications for the soluble colloids and substrate fixed metal clusters prepared according to the invention involves the development of novel materials having unusual electronic properties and providing important stimuli in the development of novel sensitive electronic components and very high scale integrated storage media based on quantum point arrays.

The colloids on undoped or doped substrates prepared according to the invention are highly active heterogeneous catalysts. They are useful e.g. as hydrogenation catalysts in hydrogenating olefins or aromatics. An application of technical interest is e.g. partial hydrogenation of benzene to form cyclohexene with substrate fixed ruthenium colloids or bimetallic colloids (e.g. Ru/Sn). The substrate fixed metal clusters prepared according to the invention may also be used as catalysts in Heck reactions, e.g. in the Pd-colloid catalyzed reaction of bromobenzene and styrene to form stilbene. The heterogeneous catalysts are also useful as electrocatalysts in fuel cells (in particular substrate fixed Pt and Pt/Ru clusters). The metal colloids prepared according to the invention are useful as homogeneous catalysts, which includes their use in two-phase systems (for instance $H_2O$/toluene), such as e.g. betaine stabilized Pd clusters soluble in $H_2O$. The soluble metal clusters may also be embedded in polymers to prepare materials for electronic, optical and magnetic applications. As the embedding component of those composite materials, there are used organic polymers, such as e.g. poly(p-phenylene-vinylene), poly(methyl methacrylate), polysilanes, and polystyrene, or inorganic polymers, such as zeolites, silicates, and metal oxides. The sol-gel process which is well-known in the art can be used to incorporate the metal clusters in amorphous metal oxide materials (e.g. $SiO_2$).

The soluble metal clusters can also be surface-deposited by electrophoretics to prepare novel materials for applications in optics and electronics, e.g. Pd on HOPG (highly oriented pyrolytic graphite).

To characterize the metal colloids, conventional analytical methods are used, in particular transmission electron microscopy (TEM) and elemental analysis. Another method of investigation that may be performed involves comparative studies by TEM/STM (scanning tunnel microscopy) which allow for a precise characterization of the stabilizing protective shell. The following examples illustrate the new method in detail without representing a limitation whatsoever thereof.

EXAMPLE 1

In a multi-purpose electrolytic cell for 20–100 ml of electrolyte are charged 90 ml of 0.1 M tetraoctylammonium bromide in THF. Two sheets of pure palladium (2×2.5 cm² geometric electrode surface area, thickness 1 mm) at a distance of about 3 mm are used as the electrodes. All operations must be performed under an inert gas atmosphere (argon or nitrogen). With vigorous stirring by means of a magnetic stirrer, a current of 5 mA which is increased to 17 mA in the course of 20 minutes is passed between the palladium electrodes. By means of jacket cooling, the electrolytic cell is maintained at 16° C. In the course of the electrolysis, the electrolyte turns deep-black. After a charge cf 640 C. has been passed, the electrolysis is stopped and the electrolyte is pressed into a 150 ml nitrogenized vessel. During this period, 300 mg of Pd have dissolved anodically, corresponding to an anode efficiency of 90% with an uptake by palladium of 2 electrons. Addition of 30 ml of oxygen-free water to the electrolyte results in the formation of a brown-grey precipitate upon vigorous shaking. The latter is allowed to set for 24 hours whereupon the clear supernatant is syphoned off. Drying under oil pump vacuum for 20 minutes yields 411 mg (99% yield based on Pd dissolved) of a grey-black powder which is amorphous by X-ray diffraction. This powder readily dissolves in THF, acetone, toluene, DMF, and is insoluble in water, diethyl ether, acetonitrile, and pentane. Elemental analysis: Pd: 72.80%; C: 19.13%; H: 3.27%; N: 0.60%; Br: 3.98%. Elemental analysis as well as the mass spectrum and NMR spectrum indicate the presence of $Noct_4Br$ which is a component of the colloid powder and efficiently prevents agglomeration of the palladium particles which is also the case in the solid state, so the powder remains completely redispersible for months. Mass spectrum: m/z=353 (trioctylamine).

Transmission electron micrographs show a narrow size distribution of colloids which are all ≦2 nm in diameter and have spherical geometries. Electrolyses in a mixed electrolyte of THF/pentane (1/1) or THF/diethylether (1/1) proceed in much the same manner. Electrolyses performed at −35° C. or in refluxing THF yield the same results, too.

EXAMPLE 2

In a multi-purpose electrolytic cell for 20–100 ml of electrolyte are charged 90 ml of 0.05 M tetraoctylammonium bromide in THF/ACN (4/1). Two sheets of pure palladium (2×2.5 cm$^2$ geometric electrode surface area, thickness 1 mm) at a distance of about 3 mm are used as the electrodes. All operations must be performed under an inert gas atmosphere (argon or nitrogen). Under ultrasonic action, a current of 5 mA which is increased to 15 mA in the course of 20 minutes is passed between the palladium electrodes. By means of jacket cooling, the electrolytic cell is maintained at 16° C. In the course of the electrolysis, the electrolyte turns deep-black. After 320 C have been passed, the electrolysis is stopped and the electrolyte is pressed under protective gas into a 150 ml nitrogenized vessel. During this period, 155 mg of Pd have dissolved anodically, corresponding to a current efficiency of 93% with an uptake by palladium of 2 electrons. Addition of 20 ml of oxygen-free water to the electrolyte results in the formation of a brown-grey precipitate upon vigorous shaking. The latter is allowed to set for 24 hours whereupon the clear supernatant is syphoned off. After drying under oil pump vacuum for 20 minutes, 207 mg (99% yield based on Pd dissolved) of a grey-black powder is obtained. This powder readily dissolves in THF, acetone, toluene, DMF, and is insoluble in water, diethyl ether, acetonitrile, and pertane.

Elemental analysis: Pd: 75.11%; C: 11.34%; H: 1.58%; N: 2.57%; Br: 3.31%. Mass spectrum: m/z=353 (trioctylamine), 41 (ACN).

Transmission electron micrographs show a narrow size distribution of colloids which are all ≦2 nm in diameter and have spherical geometries.

EXAMPLE 3

In a multi-purpose electrolytic cell for 20–100 ml of electrolyte are charged 90 ml of 0.05 M tetraoctylammonium bromide in THF/ACN (4/1). Two sheets of pure palladium (2×2.5 cm$^2$ geometric electrode surface area, thickness 1 mm) at a distance of about 3 mm are used as the electrodes. All operations mist be performed under an inert gas atmosphere (argon or nitrogen). Under ultrasonic action, a current of 3 mA which is increased to 5 mA in the course of 20 minutes is passed between the palladium electrodes. By means of jacket cooling, the electrolytic cell is maintained at 16° C. In the course of the electrolysis, the electrolyte turns deep-black. After 320 C have been passed, the electrolysis is stopped and the electrolyte is pressed under protective gas into a 150 ml nitrogenized vessel. During this period, 145 mg of Pd have dissolved anodically, corresponding to a current efficiency of 88% with an uptake by palladium of 2 elect:-ons. Addition of 20 ml of oxygen-free water to the electrolyte results in the formation of a brown-grey precipitate upon vigorous shaking. The latter is allowed to set for 24 hours whereupon the clear supernatant is syphoned off. After drying under oil pump vacuum for 20 minutes, 180 mg (99% yield based on Pd dissolved) of a grey-black powder is obtained. This powder readily dissolves in THF, acetone, toluene, DMF, and is insoluble in water, diethyl ether, acetonitrile, and pentane.

Elemental analysis: Pd: 74% Mass spectrum: m/z=353 (trioctylamine), 41 (ACN)

Transmission electron micrographs show a narrow size distribution of colloids which are all ≦6 nm in diameter (maxima between 4–6 nm) and have spherical geometries.

EXAMPLE 4

In a multi-purpose electrolytic cell for 20–100 ml of electrolyte are charged 90 ml of 0.05 M tetraoctylammonium bromide in THF/ACN (4/1). All operations must be performed under an inert gas atmosphere (argon or nitrogen). Two sheets of pure palladium (2×2.5 cm$^2$ geometric electrode surface area, thickness 1 mm) at a distance of about 3 mm are used as the electrodes. Under ultrasonic action, a current of 1 mA which is increased to 2 mA in the course of 20 minutes is passed between the palladium electrodes. By means of jacket cooling, the electrolytic cell is maintained at 16° C. In the course of the electrolysis, the electrolyte turns deep-black. After 320 C have been passed, the electrolysis is stopped and the electrolyte is pressed into a 150 ml nitrogenized vessel. During this period, 140 mg of Pd have dissolved anodically, corresponding to a current efficiency of 85% with an uptake by palladium of 2 electrons. Addition of 20 ml of oxygen-free water to the electrolyte results in the formation of a brown-grey precipitate upon vigorous shaking. The latter id allowed to set for 24 hours whereupon the clear supernatant is syphoned off. After drying under oil pump vacuum for 20 minutes, 175 mg (99% yield based on Pd dissolved) of a grey-black powder is obtained. This powder readily dissolves in THF, acetone, toluene, DMF, and is insoluble in water, diethyl ether, acetonitrile, and pentane.

Elemental analysis: Pd: 74% Mass spectrum: m/z=353 (trioctylamine), 41 (ACN)

Transmission electron micrographs show a broader size distribution of colloids which are all ≦12 nm in diameter and in addition to spherically shaped colloids also include cornered ones. The course of the experiments in examples 1–4 will be absolutely analogous, if $NMe_2dodecyl_2Br$ or $NMe_2octyl_2Br$ is used as the supporting electrolyte.

EXAMPLE 5

In a multi-purpose electrolytic cell for 20–100 ml of electrolyte are charged 90 ml of 0.05 M tetraoctylammonium bromide in ACN. All operations must be performed under an inert gas atmosphere (argon or nitrogen). Two sheets of pure palladium (2×2.5 cm$^2$ geometric electrode surface area, thickness 1 mm) at a distance of about 3 mm are used as the electrodes. Under ultrasonic action, a current of 5 mA which is increased to 20 mA in the course of 20 minutes is passed between the palladium electrodes. By means of jacket cooling, the electrolytic cell is maintained at 16° C. In the course of the electrolysis, the electrolyte turns deep-black. After 320 C have been passed, the electrolysis is stopped and the electrolyte is pressed into a 150 ml nitrogenized vessel. During this period, 156 mg of Pd have dissolved anodically, corresponding to a current efficiency of 95% with an uptake by palladium of 2 electrons. The electrolyte is allowed to stand for 24 hours during which a grey-brown to black precipitate is setting, and the clear supernatant is syphoned off. After drying under oil pump vacuum for 20 minutes, 205 mg (99% yield based on Pd dissolved) of a grey-black powder is obtained. This powder readily dissolves in THF, acetone, toluene, DMF, and is insoluble in water, diethyl ether, acetonitrile, and pentane. Elemental analysis: Pd: 74%.

Mass spectrum: m/z=353 (trioctylamine), 41 (ACN)

Transmission electron micrographs show a narrow size distribution of colloids which are all <6 nm in diameter (maxima between 4–6 nm) and have spherical geometries.

EXAMPLE 6

In a multi-purpose electrolytic cell for 20–100 ml of electrolyte are charged 90 ml of 0.0125 M tetraoctylammonium bromide in THF. All operations must be performed under an inert gas atmosphere. Two sheets of pure palladium (2×2.5 cm$^2$ geometric electrode surface area, thickness 1 mm) at a distance of about 3 mm are used as the electrodes. Under ultrasonic action, a current of 2 mA which is increased to 9 mA in the course of 20 minutes is passed between the palladium electrodes. By means of jacket cooling, the electrolytic cell is maintained at 16° C. In the course of the electrolysis, the electrolyte turns deep-black. After 160 C have been passed, the electrolysis is stopped and the electrolyte is pressed into a 150 ml nitrogenized vessel. During this period, 75 mg of Pd have dissolved anodically, corresponding to a current efficiency of 90% with an uptake by palladium of 2 electrons. Addition of 20 ml of oxygen-free water to the electrolyte results in the formation of a brown-grey precipitate upon vigorous shaking. The latter is allowed to set for 24 hours, whereupon the clear supernatant is syphoned off. After drying under oil pump vacuum for 20 minutes, 102 mg (99% yield based on Pd dissolved) of a grey-black powder is obtained. This powder readily dissolves in THF, acetone, toluene, DMF, and is insoluble in water, diethyl ether, acetonitrile, and pentane.

Elemental analysis: Pd: 74% Mass spectrum: m/z=353 (trioctylamine)

Transmission electron micrographs show a very broad size distribution of colloids which are in the range of 2–50 nm.

EXAMPLE 7

In a multi-purpose electrolytic cell for 20–100 ml of electrolyte are charged 90 ml of 0.1 M tetraoctylammonium bromide in propylene carbonate. All operations must be performed under an inert gas atmosphere (argon or nitrogen). Two sheets of pure palladium (2×2.5 cm$^2$ geometric electrode surface area, thickness 1 mm) at a distance of about 3 mm are used as the electrodes. Under ultrasonic action, a current of 5 mA which is increased to 17 mA in the course of 20 minutes is passed between the palladium electrodes. By means of jacket cooling, the electrolytic cell is maintained at 16° C. In the course of the electrolysis, the electrolyte turns deep-black. After 640 C have been passed, the electrolysis is stopped and the electrolyte is pressed into a 150 ml nitrogenized vessel. During this period, 283 mg of Pd have dissolved anodically, corresponding to a currert efficiency of 85% with an uptake by palladium of 2 electrons. Addition of 30 ml of diethyl ether to the electrolyte results in the formation of a brown-grey precipitate upon vigorous shaking. The latter is allowed to set for 24 hours, whereupon the clear supernatant is syphoned off. The precipitate is then washed successively with 5 ml of diethyl ether and 5 ml of pentane. Drying under high vacuum for 4 hours yields 346 mg (93% yield based on Pd dissolved) of a grey-black powder. This powder readily dissolves in THF, acetone, toluene, DMF, and is insoluble in water, diethyl ether, acetonitrile, and pentane.

Elemental analysis: Pd: 76%

Transmission electron micrographs show a narrow size distribution of colloids which are all <6 nm in diameter and have spherical geometries.

EXAMPLE 8

In a multi-purpose electrolytic cell for 20–100 ml of electrolyte are charged 90 ml of 0.03 M tetrabutylammonium bromide in THF. All operations must be performed under an inert gas atmosphere (argon or nitrogen). In this solution, 3 g of 3-(dimethyldodecylammonio)propanesulfonate (9 mmol) are suspended. Two sheets of pure palladium (2×2.5 cm$^2$ geometric electrode surface area, thickness 1 mm) at a distance of about 3 mm are used as the electrodes. Under ultrasonic action, a current of 5 mA which is increased to 13 mA in the course of 20 minutes is passed between the palladium electrodes. By means of jacket cooling, the electrolytic cell is maintained at 28° C. During this period, the electrolyte turns deep-black. After 400 C have been passed, the electrolysis is stopped and the electrolyte is pressed into a 150 ml nitrogenized vessel. During this period, 150 mg of Pd have dissolved anodically, corresponding to a current efficiency of 92% with an uptake by palladium of 2 electrons. Within 24 h, a grey-black precipitate forms. The slightly red-colored supernatant is pressed off under protective gas and the precipitate is washed twice with 10 ml of THF (thermostated al 30° C.). Drying under oil pump vacuum for 20 minutes yields 304 mg (88% yield based on Pd dissolved) of a grey-black powder. This powder readily dissolves in water and ethanol, and is insoluble in diethyl ether, acetonitrile, THF, DMF, and pentane.

Elemental analysis: Pd: 50%

Transmission electron micrographs show a narrow size distribution of colloids which are all <16 nm in diameter and have spherical geometries.

EXAMPLE 9

In a multi-purpose electrolytic cell for 20–100 ml of electrolyte are charged 90 ml of 0.1 M tetradodecylammonium bromide in THP. All operations must be performed under an inert gas atmosphere (argon or nitrogen). Two sheets of pure palladium (2×2.5 cm$^2$ geometric electrode surface area, thickness 1 mm) at a distance of about 3 mm are used as the electrodes. With vigorous stirring by means of a magnetic stirrer, a current of 5 mA which is increased to 12 mA in the course of 20 minutes is passed between the palladium electrodes. By means of jacket cooling, the electrolytic cell is maintained at 28° C. In the course of the electrolysis, the electrolyte turns deep-black. After 640 C have been passed, the electrolysis is stopped and the electrolyte is pressed into a 150 ml nitrogenized vessel. During this period, 275 mg of Pd have dissolved anodically, corresponding to a current efficiency of 83% with an uptake by palladium of 2 electrons. Addition of 10 ml of oxygen-free water to the electrolyte results in the formation of a brown-grey precipitate upon vigorous shaking. The latter is allowed to set for 24 hours, whereupon the clear supernatant is syphoned off. After drying under oil pump vacuum for 20 minutes, 375 mg (99% yield based on Pd dissolved) of a grey-black powder is obtained. This powder readily dissolves in THF and toluene, and is insoluble in water, diethyl ether, acetonitrile, and pentane.

Elemental analysis: Pd: 72.58%; C: 9.87%; H: 2.02%; N: 0.75%; Br: 11.12%. Mass spectrum: m/z=521 (tridodecylamine).

Transmission electron micrographs show a narrow size distribution of colloids which are all <4 nm in diameter and have spherical geometries.

EXAMPLE 10

In a multi-purpose electrolytic cell for 20–100 ml of electrolyte are charged 90 ml of 0.1 M tetrabutylammonium bromide in THF. All operations must be performed under an inert gas atmosphere (argon or nitrogen). Two sheets of pure palladium (2×2.5 cm² geometric electrode surface area, thickness 1 mm) at a distance of about 3 mm are used as the electrodes. With vigorous stirring by means of a magnetic stirrer, a current of 5 mA which is increased to 12 mA in the course of 20 minutes is passed between the palladium electrodes. By means of jacket cooling, the electrolytic cell is maintained at 28° C. In the course of the electrolysis, the electrolyte turns deep-black. After 640 C have been passed, the electrolysis is stopped and the electrolyte is pressed into a 150 ml nitrogenized vessel. During this period, 308 mg of Pd have dissolved anodically, corresponding to a current efficiency of 93% with an uptake by palladium of 2 electrons. Addition of 10 ml of oxygen-free water to the electrolyte results in the formation of a brown-grey precipitate upon vigorous shaking. The latter is allowed to set for 24 hours, whereupon the clear supernatant is syphoned off. After drying under oil pump vacuum for 20 minutes, 350 mg (99% yield based on Pd dissolved) of a grey-black powder is obtained. This powder readily dissolves in DMF, and is insoluble in water, diethyl ether, THF, acetonitrile, and pentane.

Elemental analysis: Pd: 86.46%; C: 8.98%; H: 1.68%; N: 0.76%; Br: 2.06%. Mass spectrum: m/z=242 (tetrabutylammonium); 185 (tributylamine). Transmission electron micrographs show a narrow size distribution of colloids which are all <4 nm in diameter and have spherical geometries.

Electrolyses using NBu4Cl, NBu$_4$I, and PBu4Cl as stabilizers proceed in much the same manner.

EXAMPLE 11

In a multi-purpose electrolytic cell for 20–100 ml of electrolyte are charged 90 ml of 0.1 M tetraoctylammonium bromide in THF. In this solution, 2.8 g of thoroughly dried and mortar-ground active charcoal is suspended. All operations must be performed under an inert gas atmosphere (argon or nitrogen). Two sheets of pure palladium (2×2.5 cm² geometric electrode surface area, thickness 1 mm) at a distance of about 3 mm are used as the electrodes. Under ultrasonic action, a current of 5 mA which is increased to 15 mA in the course of 20 minutes is passed between the palladium electrodes. By means of jacket cooling, the electrolytic cell is maintained at 16° C. In the course of the electrolysis, the electrolyte turns deep-black. After 320 C have been passed, the electrolysis is stopped and the electrolyte is pressed into a 150 ml nitrogenized vessel. During this period, 155 mg of Pd have dissolved anodically, corresponding to a current efficiency of 93% with an uptake by palladium of 2 electrons. Further processing includes addition of 40 ml of ethanol and vigorous stirring. Filtering through a D4 frit and subsequent washing with 2 portions of 10 ml of ethanol and drying under oil pump vacuum yields 2.9 g of a grey-black powder. The catalyst thus obtained comprises 5.5% of Pd. Transmission electron micrographs show a narrow size distribution of Pd colloids in the range of 2 nm which are adsorbed on the active charcoal.

EXAMPLE 12

In a multi-purpose electrolytic cell for 20–100 ml of electrolyte are charged 90 ml of 0.1 M tetraoctylammonium bromide in THF. Since the metal colloid is very sensitive to air and moisture, special care is to be taken that the solvents are free of water and oxygen. All operations must be performed under an inert gas atmosphere (argon or nitrogen). Two sheets of pure nickel (2×2.5 cm² geometric electrode surface area, thickness 1 mm) at a distance of about 3 mm are used as the electrodes. Under ultrasonic action, a current of 5 mA which is increased to 15 mA in the course of 20 minutes is passed between the Ni electrodes. By means of jacket cooling, the electrolytic cell is maintained at 16° C. In the course of the electrolysis, the electrolyte turns deep-black. After 320 C have been passed, the electrolysis is stopped and the electrolyte is pressed into a 150 ml nitrogenized vessel. During this period, 89 mg of Ni have dissolved anodically, corresponding to a current efficiency of 96% with an uptake by nickel of 2 electrons. Evaporation of the solvent under oil pump vacuum yields 5 g of a black viscous mass. Addition of 30 ml of an ether/ethanol mixture (9/1) results in the formation of a grey-black precipitate upon vigorous shaking. The latter is allowed to set for 24 hours, whereupon the clear supernatant is syphoned off. Washing is performed with 10 ml of pentane, and after drying under oil pump vacuum for 20 minutes, 178 mg (80% yield based on Ni dissolved) of a grey-black powder is obtained which is amorphous by X-ray diffraction. This powder readily dissolves in THF and toluene, and is insoluble in diethyl ether, acetonitrile, and pentane. The colloid is very sensitive to air and moisture.

Elemental analysis: Ni: 40.05%

Transmission electron micrographs show a narrow size distribution of colloids which are all <10 nm in diameter and have spherical geometries.

EXAMPLE 13

In a multi-purpose electrolytic cell for 20–100 ml of electrolyte are charged 90 ml of 0.1 M tetraoctylammonium bromide in THF. Since the metal colloid is very sensitive to air and moisture, special care is to be taken that the solvents are free of water and oxygen. All operations must be performed under an inert gas atmosphere (argon or nitrogen). Sheets of pure cobalt (2×2.5 cm² geometric electrode surface area, thickness 1 mm) at a distance of about 3 mm are used as the electrodes. Under ultrasonic action, a current of 5 mA which is increased to 15 mA in the course of 20 minutes is passed between the Co electrodes. By means of jacket cooling, the electrolytic cell is maintained at 16° C. In the course of the electrolysis, the electrolyte turns deep-black. After 320 C have been passed, the electrolysis is stopped and the electrolyte is pressed into a 150 ml nitrogenized vessel. During this period, 89 mg of Co have dissolved anodically, corresponding to a current efficiency of 96% with an uptake by cobalt of 2 electrons. Evaporation of the solvent under oil pump vacuum yields 5 g of a black viscous mass. Addition of 30 ml of an ether/ethanol mixture (9/1) results in the formation of a grey-black precipitate upon vigorous shaking The latter is allowed to set for 24 hours, whereupon the clear supernatant is syphoned off. Washing is performed with 10 ml of pentane, and after drying under oil pump vacuum for 20 minutes, 178 mg (80% yield based on Co dissolved) of a grey-black powder is obtained which is amorphous by X-ray diffraction. This powder readily dissolves in THF, toluene, and is insoluble in diethyl ether, acetonitrile, and pentane. The colloid is very sensitive to air and moisture. Elemental analysis: Co: 39.23%

Transmission electron micrographs show a narrow size distribution of colloids which are all <3 nm in diameter and have spherical geometries.

EXAMPLE 14

In a multi-purpose electrolytic cell for 20–100 ml of electrolyte are charged 90 ml of 0.1 M tetraoctylammonium bromide in THF. Since the metal colloid is very sensitive to air and moisture, special care is to be taken that the solvents are free of water and oxygen. All operations must be performed under an inert gas atmosphere (argon or nitrogen). Sheets of electrolytic copper (2×2.5 cm² geometric electrode surface area, thickness 1 mm) at a distance of about 3 mm are used as the electrodes. Under ultrasonic action, a current of 5 mA which is increased to 15 mA in the course of 20 minutes is passed between the copper electrodes. By means of jacket cooling, the electrolytic cell is maintained at 16° C. In the course of the electrolysis, the electrolyte turns deep-cherry to black. After 640 C have been passed, the electrolysis is stopped and the electrolyte is pressed into a 150 ml nitrogenized vessel. During this period, 336 mg of Cu have dissolved anodically, corresponding to a current efficiency of 96% with an uptake by copper of 1 electron. Evaporation of the solvent under oil pump vacuum yields 5.2 g of a black viscous mass. The colloid is very sensitive to air and moisture. The colloid thus obtained is redispersible in THF. When the solution is too much diluted, a nanocrystalline Cu powder precipitates which is amorphous by X-ray diffraction.

Elemental analysis of the colloid: 6.4% of Cu Elemental analysis of the powder: 98% of Cu Transmission electron micrographs show a narrow size distribution of colloids which are all <10 nm in diameter and have spherical geometries.

EXAMPLE 15

In a multi-purpose electrolytic cell for 20–100 ml of electrolyte are charged 90 ml of 0.1 M tributylhexadecylphosphonium bromide in THF. All operations must be performed under an inert gas atmosphere (argon or nitrogen). Two sheets of fine gold (2×2.5 cm² geometric electrode surface area, thickness 1 mm) at a distance of about 3 mm are used as the electrodes. Under ultrasonic action, a current of 5 mA which is increased to 15 mA in the course of 20 minutes is passed between the gold electrodes. By means of jacket cooling, the electrolytic cell is maintained at 16° C. In the course of the electrolysis, the electrolyte turns deep-cherry to black. After 640 C have been passed, the electrolysis is stopped and the electrolyte is pressed into a 150 ml nitrogenized vessel. During this period, 1300 mg of Au have dissolved anodically, corresponding to a current efficiency of 96% with an uptake by gold of 1 electron. Evaporation of the solvent under oil pump vacuum leaves 6.2 g of a black viscous mass. The colloid is sensitive to air and moisture. The colloid thus obtained is redispersible in THF. When the solution is too much diluted, a nanocrystalline Au powder precipitates which is amorphous by X-ray diffraction.

Elemental analysis of the colloid: 20% of Au Elemental analysis of the powder: 97% of Au Transmission electron micrographs show a narrow size distribution of colloids which are all <12 nm in diameter and have spherical or angular geometries.

EXAMPLE 16

In a multi-purpose electrolytic cell for 20–100 ml of electrolyte are charged 90 ml of 0.1 M tetraoctylammonium bromide in THF/ACN (4/1). Since the metal colloid is very sensitive to air and moisture, special care is to be taken that the solvents are free of water and oxygen. All operations must be performed under an inert gas atmosphere (argon or nitrogen). Two sheets of pure nickel (2×2.5 cm² geometric electrode surface area, thickness 1 mm) at a distance of about 3 mm are used as the electrodes. Under ultrasonic action, a current of 5 mA which is increased to 15 mA in the course of 20 minutes is passed between the nickel electrodes. By means of jacket cooling, the electrolytic cell is maintained at 16° C. In the course of the electrolysis, the electrolyte turns deep-black. After 320 C have been passed, the electrolysis is stopped and the electrolyte is pressed into a 150 ml nitrogenized vessel. During this period, 89 mg of Ni have dissolved anodically, corresponding to a current efficiency of 96% with an uptake by nickel of 2 electrons. Evaporation of the solvent under oil pump vacuum yields 5 g of a black viscous mass. Addition of 30 ml of an ether/ethanol mixture (9/1) results in the formation of a grey-black precipitate upon vigorous shaking. The latter is allowed to set for 24 hours, whereupon the clear supernatant is syphoned off. Washing is performed with 10 ml of pentane, and after drying under oil pump vacuum for 20 minutes, 178 mg (80% yield based on Ni dissolved) of a grey-black powder is obtained. This powder readily dissolves in THF and toluene, and is insoluble in diethyl ether, acetonitrile, and pentane. The colloid is very sensitive to air and moisture.

Elemental analysis: Ni: 36.46%; C: 28.29%; H: 4.01%; N: 13.22%; Br: 2.72%.

Transmission electron micrographs show a narrow size distribution of colloids which are all ≦6 nm in diameter and have spherical geometries.

EXAMPLE 17

In a multi-purpose electrolytic cell for 20–100 ml of electrolyte are charged 60 ml of 0.2 M tetrabutylammonium bromide in ACN. All operations must be performed under an inert gas atmosphere (argon or nitrogen). Two sheets of pure platinum (2×2.5 cm² geometric electrode surface area, thickness 1 mm) at a distance of about 3 mm are used as the electrodes. Under ultrasonic action, a current of 30 mA which is increased to 100 mA in the course of 20 minutes is passed between the platinum electrodes. By means of jacket cooling, the electrolytic cell is maintained at 30° C. In the course of the electrolysis, the electrolyte turns deep-black. After 3200 C have been passed, the electrolysis is stopped and the electrolyte is pressed into a 150 ml nitrogenized vessel. During this period, 330 mg of Pt have dissolved anodically, corresponding to a current efficiency of 10% with an uptake by platinum of 2 electrons. Addition of 30 ml of oxygen-free water results in the formation of a grey-black precipitate upon vigorous shaking. The latter is allowed to set for 24 hours, whereupon the clear supernatant is syphoned off. Drying under oil pump vacuum yields 410 mg of a grey-black powder which is amorphous by X-ray diffraction. It very readily dissolves in ACN and DMF, and is insoluble in THF, diethyl ether, pentane, water, and toluene. Elemental analysis: 80% of Pt Transmission electron micrographs show a narrow size distribution of Pt colloids in a size range of ≦2 nm.

EXAMPLE 18

In a multi-purpose electrolytic cell for 20–100 ml of electrolyte are charged 60 ml of 0.2 M tetrabutylammonium chloride in ACN. All operations must be performed under an inert gas atmosphere (argon or nitrogen). Two sheets of pure rhodium (2×2.5 cm² geometric electrode surface area, thickness 1 mm) at a distance of about 3 mm are used as the electrodes. Under ultrasonic action, a current of 20 mA which is increased to 75 mA in the course of 20 minutes is passed between the rhodium electrodes. By means of jacket cooling, the electrolytic cell is maintained at 30° C. In the course of the electrolysis, the electrolyte turns deep-black. After 800 C have been passed, the electrolysis is stopped and the electrolyte is pressed into a 150 ml nitrogenized vessel. During this period, 207 mg of Rh have dissolved anodically, corresponding to a current efficiency of 25% with an uptake by rhodium of 1 electron. Addition of 30 ml of oxygen-free water results in the formation of a grey-black precipitate upon vigorous shaking. The latter is allowed to set for 24 hours, whereupon the clear supernatant is syphoned off. Drying under oil pump vacuum yields 2900 mg of a grey-black powder which is amorphous by X-ray diffraction. It very readily dissolves in ACN and DMF, and is insoluble in THF, diethyl ether, pentane, water, and toluene.

Elemental analysis: 70% of Rh

Transmission electron micrographs show a narrow size distribution of Rh colloids in a size range of $\leq 2$ nm.

EXAMPLE 19

In a multi-purpose electrolytic cell for 20–100 ml of electrolyte are charged 60 ml of 0.2 M tetrabutylammonium hexafluorophosphate in DME. All operations must be performed under an inert gas atmosphere (argon or nitrogen). Two sheets of pure rhodium ($2 \times 2.5$ cm$^2$ geometric electrode surface area, thickness 1 mm) at a distance of about 3 mm are used as the electrodes. Under ultrasonic action, a current of 30 mA which is increased to 100 mA in the course of 20 minutes is passed between the rhodium electrodes. By means of jacket cooling, the electrolytic cell is maintained at 30° C. In the course of the electrolysis, the electrolyte turns deep-black. After 800 C have been passed, the electrolysis is stopped and the electrolyte is pressed into a 150 ml nitrogenized vessel. During this period, 207 mg of Rh have dissolved anodically, corresponding to a current efficiency of 25% with an uptake by rhodium of 1 electron. Addition of 30 ml of oxygen-free water results in the formation of a grey-black precipitate upon vigorous shaking. The latter is allowed to set for 24 hours, whereupon the clear supernatant is syphoned off. Drying under oil pump vacuum yields 258 mg of a grey-black powder which is amorphous by X-ray diffraction. It very readily dissolves in ACN and DMF, and is insoluble in THF, diethyl ether, pentane, water, and toluene.

Elemental analysis: 80% of Rh

Transmission electron micrographs show a narrow size distribution of Rh colloids in a size range of $\leq 2$ nm.

EXAMPLE 20

In a multi-purpose electrolytic cell for 20–100 ml of electrolyte are charged 60 ml of 0.2 M tetrabutylammonium hexafluorophosphate in DME. All operations must be performed under an inert gas atmosphere (argon or nitrogen). Two sheets of pure platinum ($2 \times 2.5$ cm$^2$ geometric electrode surface area, thickness 1 mm) at a distance of about 3 mm are used as the electrodes. Under ultrasonic action, a current of 30 mA which is increased to 100 mA in the course of 20 minutes is passed between the platinum electrodes. By means of jacket cooling, the electrolytic cell is maintained at 30° C. In the course of the electrolysis, the electrolyte turns deep-black. After 100 C have been passed, the electrolysis is stopped and the electrolyte is pressed into a 150 ml nitrogenized vessel. During this period, 330 mg of Pt have dissolved anodically, corresponding to a current efficiency of 30% with an uptake by platinum of 2 electrons. Addition of 30 ml of oxygen-free water results in the formation of a grey-black precipitate upon vigorous shaking. The latter is allowed to set for 24 hours, whereupon the clear supernatant is syphoned off. Drying under oil pump vacuum yields 410 mg of a grey-black powder which is amorphous by X-ray diffraction. It very readily dissolves in ACN and DMF, and is insoluble in THF, diethyl ether, pentane, water, and toluene.

Elemental analysis: 80% of Pt

Transmission electron micrographs show a narrow size distribution of Pt colloids in a size range of $\leq 2$ nm.

EXAMPLE 21

In a multi-purpose electrolytic cell for 20–100 ml of electrolyte are charged 90 ml of 0.1 M tetraoctylammonium bromide in-THF/ACN (4/1). Since the metal colloid is very sensitive to air and moisture, special care is to be taken that the solvents are free of water and oxygen. All operations must be performed under an inert gas atmosphere (argon or nitrogen). Two sheets of pure nickel ($2 \times 2.5$ cm$^2$ geometric electrode surface area, thickness 1 mm) at a distance of about 3 mm are used as the electrodes. Under ultrasonic action, a current of 6 mA is passed between the nickel electrodes. By means of jacket cooling, the electrolytic cell is maintained at 16° C. In the course of the electrolysis, the electrolyte turns deep-black. After 320 C have been passed, the electrolysis is stopped and the electrolyte is pressed into a 150 ml nitrogenized vessel. During this period, 89 mg of Ni have dissolved anodically, corresponding to a current efficiency of 96% with an uptake by nickel of 2 electrons. Evaporation of the solvent under oil pump vacuum yields 5 g of a black viscous mass. Addition of 30 ml of an ether/ethanol mixture (9/1) results in the formation of a grey-black precipitate upon vigorous shaking. The latter is allowed to set for 24 hours, whereupon the clear supernatant is syphoned off. Washing is performed with 10 ml of pentane, and after drying under oil pump vacuum for 20 minutes, 178 mg (80% yield based on Ni dissolved) of a grey-black powder is obtained. This powder readily dissolves in THF and toluene, and is insoluble in diethyl ether, acetonitrile, and pentane. The colloid is very sensitive to air and moisture. Elemental analysis: 60% of Ni Transmission electron micrographs show a broader size distribution of colloids which are all <30 nm in diameter and have spherical or polyhedral geometries. The colloid particles are significantly larger than those in example 16 where a lower current density has been employed (cf.examples 2 through 4:Pd).

EXAMPLE 22

In a multi-purpose electrolytic cell for 20–100 ml of electrolyte are charged 90 ml of 0.1 M tetraoctylammonium bromide in THF. All operations must be performed. under an inert gas atmosphere (argon or nitrogen). Two sheets of fine silver ($2 \times 2.5$ cm$^2$ geometric electrode surface area, thickness 1 mm) at a distance of about 3 mm are used as the electrodes. Under ultrasonic action, a current of 5 mA which is increased to 15 mA in the course of 20 minutes is passed between the silver electrodes. By :means of jacket cooling, the electrolytic cell is maintained at 16° C. In the course of the electrolysis, the electrolyte turns deep-cherry to black. After 640 C have been passed, the electrolysis is stopped and the electrolyte is pressed into a 150 ml nitrogenized vessel. During this period, 712 mg of Ag have dissolved anodically, corresponding to a current efficiency of 96% with an uptake by silver of 1 electron. Evaporation of the solvent under oil pump vacuum leaves 700 mg of a black viscous mass. The colloid is sensitive to air and moisture. The nanocrystalline powder thus obtained is not redispersible in THF.

Elemental analysis of the powder: 93% of Ag

Transmission electron micrographs show a narrow size distribution of agglomerated particles which are all ≦12 nm in diameter and have spherical or hexagonal geometries.

EXAMPLE 23

Experimental protocol for the preparation of a Pd/Ni bimetallic colloid

In a multi-purpose electrolytic cell for 20–100 ml of electrolyte are charged 80 ml of 0.1 M tetraoctylammonium bromide in THF. A sheet of pure platinum (5×5 cm² geometric electrode surface area) is used as the cathode. An electrode of pure nickel and an electrode of pure palladium (2.5×5 cm² geometric electrode surface area) which are placed side by side at a distance of 4 mm to the cathode are both used as anodes. All operations must be performed under an inert gas atmosphere (argon); all solvents must be thoroughly dried and freshly destilled. At a temperature of 30° C. and under ultrasonic action, a current of 30 mA is passed between nickel and platinum as well as between palladium and platinum by means of a double power supply unit, so both currents can be controlled independently. In the course of the electrolysis, the solution turns deep-brown to black. After a total of 1 Ah has been passed, the electrolysis is stopped. During this period, 350 mg of nickel (=65% current efficiency) and 600 mg of palladium (=61% current efficiency) have dissolved. The solvent is evaporated and the tacky residue is cried under a good oil pump vacuum. The black residue thus obtained is washed first with 50 ml of pentane and thereafter 5 times with 40 ml of an ethanol/pentane mixture (1.5/10). After drying under oil pump vacuum, 1.1 g of a grey-black powder is obtained. This powder very readily dissolves in THF and acetone, is less soluble in toluene and ethanol, and insoluble in ether, pentane, acetonitrile, and water. The THF colloid solutions thus obtained are stable for months.

Transmission electron micrographs show well-separated, spherically shaped colloids in a size range of from 0.5 to 4 nm. Energy-dispersive X-ray spot analyses (EDX) reveal that almost all of the colloid particles contain both metals. Investigations by elemental analysis indicate a Pd/Ni ratio of 42/18.

EXAMPLE 24

Experimental protocol for the preparation of a Pd/Ni bimetallic colloid

In a multi-purpose electrolytic cell for 20–100 ml of electrolyte are charged 80 ml of 0.1 M tetraoctylammonium bromide in THF. A sheet of pure platinum (5×5 cm² geometric electrode surface area) is used as the cathode. An electrode of pure nickel and an electrode of pure palladium (2.5×5 cm² geometric electrode surface area) which are placed side by side at a distance of 4 mm to the cathode are both used as anodes. All operations must be performed under an inert gas atmosphere (argon); all solvents must be thoroughly dried and freshly destilled. At a temperature of 30° C. and under ultrasonic action, a current of 30 mA is passed between nickel and platinum and a current of 5 mA is passed between palladium and platinum by means of a double power supply unit, so both currents can be controlled independently. In the course of the electrolysis, the solution turns deep-brown to black. After a total of 1 Ah has been passed, the electrolysis is stopped. During this period, 670 mg of nickel (=80% current efficiency) and 290 mg of palladium (=90% current efficiency) have dissolved. The same product is observed if an anode made of an alloy with a Pd/Ni ratio of 5/25 is employed. The solvent is evaporated and the tacky residue is dried under a good oil pump vacuum. The black residue thus obtained is washed first with 50 ml of pentane and thereafter 5 times with 40 ml of an ethanol/pentane mixture (1.5/10). After drying under oil pump vacuum, 1.1 g of a grey-black powder is obtained. This powder very readily dissolves in THF and acetone, is less soluble in toluene and ethanol, and insoluble in ether, pentane, acetonitrile, and water. The THF colloid solutions thus obtained are stable for months. Transmission electron micrographs show well-separated, spherically shaped colloids in a size range of from 0.5 to 4 nm. EDX spot analyses reveal that almost all of the colloid particles contain both metals. Investigations by elemental analysis indicate a Pd/Ni ratio of 5/25. When this is compared to the results of example 23, it can be seen that the colloid composition can be controlled through the relative currents passing through the two metal anodes.

EXAMPLE 25

In a multi-purpose electrolytic cell for 20–100 ml of electrolyte are charged 90 ml of 0.1 M tetraoctylammonium bromide in toluene. Two sheets of pure palladium (2×2.5 cm² geometric electrode surface area, thickness 1 mm) at a distance of about 3 mm are used as the electrodes. All operations must be performed under an inert gas atmosphere (argon or nitrogen). With vigorous stirring by means of a magnetic stirrer or with the use of ultrasonic waves, a current of 5 mA which is increased to 17 mA in the course of 10 min is passed between the palladium electrodes. By means of a jacket heating, the electrolytic cell is maintained at 60–130° C. In the course of the electrolysis, the electrolyte turns deep-black. After a charge of 640 C has been passed, the electrolysis is stopped and the electrolyte is pressed into a 150 ml nitrogenized vessel. During this period, 300 mg of palladium have dissolved anodically, corresponding to an anodic efficiency of 90%. Evaporation of the solvent under oil pump vacuum leaves 4.4 g of a black solid. This is washed 3 times with 40–50 ml of an ethanol/pentane mixture (3/7) to yield 360 mg of a grey-black powder which is amorphous by X-ray diffraction. This powder readily dissolves in THF, acetone and toluene, and is insoluble in water, diethyl ether, and pentane.

Elemental analysis: Pd 72.5%; the residual 27.5% consists of tetraoctylammonium bromide protecting the particles as a colloid stabilizer.

Transmission electron micrographs show a narrow size distribution of colloids which are all ≦5 nm in diameter and have spherical geometries.

EXAMPLE 26

In a multi-purpose electrolytic cell for 20–100 ml of electrolyte are charged 90 ml of 0.1 M tetraoctadecylammoniur bromide in THF. The salt will dissolve completely if the electrolytic vessel is maintained at a temperature of 60° C. Two sheets of pure palladium (2×2.5 cm² geometric electrode surface area, thickness 1 mm) at a distance of about 3 mm are used as the electrodes. All operations must be performed under an inert gas atmosphere (argon or nitrogen). With vigorous stirring by means of a magnetic stirrer or with the use of ultrasonic waves, a current of 5 mA which is increased to 17 mA in the course of 10 min is passed between the palladium electrodes. By means of a jacket heating, the electrolytic cell is maintained at 60° C. In the course of the electrolysis, the electrolyte turns deep-black. After a charge of 640 C has been passed, the electrolysis is stopped and the electrolyte is pressed into a 150 ml nitrogenized vessel. During this period, 300 mg of palladium have dissolved anodically, corresponding to an anodic efficiency of 90% with an uptake by palladium of 2 electrons. Evaporation of the solvent under oil pump vacuum leaves 9.5 g of a black solid. This is dissolved in 60 ml of toluene to which 30 ml of an ethanol/water mixture (6/1) is added. After vigorous shaking, a brown-grey precipitate forms. This is allowed to set for 24 hours, whereupon the clear supernatant is syphoned off. Drying under oil pump vacuum for 20 minutes yields 500 mg (95% yield based on palladium dissolved) of a grey-black powder which is amorphous by X-ray diffraction. This powder readily dissolves in pentane and toluene, is poorly soluble in THF and insoluble in water and acetone.

Elemental analysis: 58.8% of Pd; the residual 41.2% consists of tetraoctadecylammonium bromide protecting the particles as a colloid stabilizer.

Transmission electron micrographs show a narrow size distribution of colloids which are all $\leq 6$ nm in diameter and have spherical geometries. The solubilities of the colloid powders depend on the protective colloid employed and can be adjusted within a selected range from water soluble to pentane soluble:

| protective colloid employed | solubility of colloid powder | Example No. |
|---|---|---|
| (dimethyldodecylammonio) - propanesulfonate | water > ethanol | 8 |
| tetrabutylammonium bromide | DMF > THF | 10 |
| tetrabutylammonium bromide | THF > toluene | 1 |
| tetradodecylammonium bromide | toluene > THF | 9 |
| tetraoctadecylammonium bromide | pentane > toluene > THF | 26 |

EXAMPLE 27

In a multi-purpose electrolytic cell for 20–100 ml of electrolyte are charged 90 ml of 0.1 M tetraoctylammonium perchlorate in THF. All operations must be performed under an inert gas atmosphere (argon or nitrogen). Two sheets of pure palladium (2×2.5 cm² geometric electrode surface area, thickness 1 mm) at a distance of about 3 mm are used as the electrodes. With vigorous stirring or with the use of ultrasonic waves, a current of 5 mA which is increased to 17 mA in the course of 20 min is passed between the palladium electrodes. By means of jacket cooling, the electrolytic cell is maintained at 16° C. In the course of the electrolysis, the electrolyte turns deep-black and a grey-brown powder precipitates. After a charge of 640 C has been passed, the electrolysis is stopped and the electrolyte is pressed into a 150 ml nitrogenized vessel. During this period, 300 mg of palladium have dissolved anodically, corresponding to an anodic efficiency of 90%. The precipitate is allowed to set for 24 hours, whereupon the brown supernatant is syphoned off. After drying under oil pump vacuum for 20 minutes, 320 mg of a grey-black solid is obtained which consists of agglomerated Pd particles having sizes of $\leq 8$ nm according to transmission electron micrographs. Elemental analysis indicates a Pd content of 92% (the remainder is tetraoctylammonium perchlorate). The powder thus obtained is not completely soluble in THF or other solvents, however, which indicates poor wetting of the colloid particles by the stabilizer. The same results have been obtained with other large, non-coordinating anions, such as $BF_4^-$. Coordinating anions, such as e.g. halogenide, are crucial to the stabilization of the colloids and hence redispersibility.

EXAMPLE 28

Preparation of a Colloid with Chiral Protective Shell—Chirality at the Quaternary N Atom In a multi-purpose electrolytic cell for 20–100 ml of electrolyte are charged 90 ml of 0.1 M butylbenzyloctyldodecylammonium bromide in THF. Two sheets of pure palladium (2×2.5 cm² geometric electrode surface area, thickness 1 mm) at a distance of about 3 mm are used as the electrodes. All operations must be performed under an inert gas atmosphere (argon or nitrogen). With vigorous stirring by means of a magnetic stirrer or with the use of ultrasonic waves, a current of 5 mA which is increased to 17 mA in the course of 10 min is passed between the palladium electrodes. By means of a jacket heating, the electrolytic cell is maintained at 30° C. In the course of the electrolysis, the electrolyte turns deep-black. After a charge of 640 C has been passed, the electrolysis is stopped and the electrolyte is pressed into a 150 ml nitrogenized vessel. During this period, 300 mg of palladium have dissolved anodically, corresponding to an anodic efficiency of 90%. Addition of 25 ml of oxygen-free water results in the formation of a brown-grey precipitate. This is allowed to set for 24 hours, whereupon the clear supernatant is syphoned off. After drying under oil pump vacuum, 350 mg of a grey-black solid is obtained. This s o lid readily dissolves in THF and toluene, and is insoluble in water and pentane.

Elemental analysis: 72% of Pd; the residual 28% consists of butylbenzyloctyldodecylammonium bromide protecting the particles as a colloid stabilizer.

Transmission electron micrgraphs show a narrow size distribution of Pd colloids which are all <4 nm in diameter.

EXAMPLE 29

Preparation of a Colloid with Chiral Protective Shell—Chirality in the Side Chain In a multi-purpose electrolytic cell for 20–100 ml of electrolyte are charged 90 ml of 0.1 M tributyl (1-methylbenzyl)ammonium bromide in THF. Two sheets of pure palladium (2×2.5 cm² geometric elect rode surface area, thickness 1 mm) at a distance of about 3 mm are used as the electrodes. All operations must be performed under an inert gas atmosphere (argon or nitrogen). With vigorous stirring by means of a magnetic stirrer or with the use of ultrasonic waves, a current of 5 mA which is increased to 17 mA in the course of 10 min is passed between the palladium electrodes. By means of a jacket heating, the electrolytic cell is maintained at 35° C. In the course of the electrolysis, the electrolyte turns deep-black and a brown-grey precipitate forms. After a charge of 640 C has been passed, the electrolysis is stopped and the electrolyte is pressed into a 150 ml nitrogenized vessel. During this period, 300 mg of palladium have dissolved anodically, corresponding to an anodic efficiency of 90%. Th e precipitate is allowed to set for 24 hours, whereupon the clear supernatant is syphoned off. After drying under oil pump vacuum, 310 mg of a grey-black solid is obtained. This solid dissolves readily in DMF and poorly in THF, but is insoluble in water and pentane.

Elemental analysis: 74% of Pd; the residual 26% consists of tributyl(1-methylbenzyl)ammonium bromide protecting the particles as a colloid stabilizer. Transmission electron micrographs show a narrow size distribution of Pd colloids which are all $\leq 6$ nm in diameter.

EXAMPLE 30

In a multi-purpose electrolytic cell for 20–100 ml of electrolyte are charged 90 ml of 0.1 M tetraoctylammonium bromide in 2,5-di-methyltetrahydrofuran. Two sheets of pure palladium (2×2.5 cm² geometric electrode surface area, thickness 1 mm) at a distance of about 3 mm are used as the electrodes. All operations must be performed under an inert gas atmosphere (argon or nitrogen). With vigorous stirring by means of a magnetic stirrer, a current of 5 mA which is increased to 17 mA in the course of 10 min is passed between the palladium electrodes. By means of a jacket heating, the electrolytic cell is maintained at 39° C. In the course of the electrolysis, the electrolyte turns brown and a brown-grey precipitate forms. After a charge of 640 C has been passed, the electrolysis is stopped and the electrolyte is pressed into a 150 ml nitrogenized vessel. During this period, 300 mg of palladium have dissolved anodically, corresponding to an anodic efficiency of 90%. The precipitate is allowed to set for 3 hours at 39° C., whereupon the slightly brown supernatant is syphoned off. After drying under oil pump vacuum, 350 mg of a grey-black solid is obtained. This solid readily dissolves in THF and toluene, and is insoluble in water and pentane. The course of the experiment is analogous with Ni, Co, and Fe.

Elemental analysis: 72% of Pd; the residual 28% consists of tetraoctylammonium bromide protecting the particles as a colloid stabilizer.

Transmission electron micrographs show a narrow size distribution of Pd colloids which are all <2 nm in diameter.

EXAMPLE 31

In a multi-purpose electrolytic cell for 20–100 ml of electrolyte are charged 90 ml of 0.1 M tetrabutylammonium acetate in THF. Two sheets of pure platinum (1.5×2 cm² geometric electrode surface area, thickness 0.5 mm) at a distance of about 3 mm are used as the electrodes. All operations must be performed under an inert gas atmosphere (argon or nitrogen). Under ultrasonic action, 0.5 g of $PtCl_2$ is dissolved in the electrolyte and a current of 5 mA which is increased to 30 mA in the course of 10 min is passed between the platinum electrodes. By means of jacket cooling, the electrolytic cell is maintained at 20° C. In the course of the electrolysis, the electrolyte turns deep-black. After a charge of 365 C has been passed, the electrolysis is stopped and the electrolyte is pressed into a 200 ml nitrogenized vessel. Within 2–5 hours, a grey-black precipitate forms. The slightly brown clear supernatant is pressed off under inert gas and the precipitate is washed twice with 10 ml of diethyl ether. Drying under oil pump vacuum for one hour yields 645 mg of a grey-black powder. This powder readily dissolves in DMF, and is insoluble in water, diethyl ether, THF, acetonitrile, toluene, and pentane.

Elemental analysis: 51% of platinum. The remainder consists of the ammonium salt. This corresponds to an efficiency of 90% with an uptake of 2 electrons per platinum ion. Transmission electron micrographs show a narrow size distribution of colloids which are all 3–5 nm in diameter and have spherical geometries. Comparative TEM/STM investigations of these colloids (adsorbed from a DMF solution, substrate 200 nm gold on Tempax quartz carrier) clearly show coating of the metal cores with a monomolecular layer of stabilizer. Electrolyses with $PtBr_2$, $PtI_2$, and platinum(II) acetylacetonate proceed in much the same way.

EXAMPLE 32

The procedure and processing are analogous to that of Example 31. Electrolyte: 100 ml of 0.1 M tetrabutylammonium acetate in THF/ACN (4/1). Metal salt: 0.5 g of $PdCl_2$. Current: 5 mA, increased to 20 mA in the course of 10 minutes. Charge passed: 500 C. Product: 440 mg of a grey-black powder. This powder readily dissolves in DMF, and is insoluble in water, diethyl ether, THF, acetonitrile, toluene, and pentane.

Elemental analysis: 62% of palladium. Yield 93%. Size: <5 nm. Electrolyses with $PdBr_2$, $PdI_2$, and palladium(II) acetylacetonate proceed in much the same way.

EXAMPLE 33

The procedure and processing are analogous to that of Example 31. Electrolyte: 100 ml of 0.1 M tetrabutylammonium trifluoroacetate in THF. Metal salt: 0.5 g of $PdCl_2$. Charge passed: 500 C. Product: 458 mg of a grey-black powder. This powder readily dissolves in DMF, and is insoluble in water, diethyl ether, THF, acetonitrile, toluene, and pentane.

Elemental analysis: 54% of palladium. Yield 84%. Diameter <5 nm. Electrolyses with $PdBr_2$, $PdI_2$, and palladium(II) acetylacetonate proceed in much the same way.

EXAMPLE 34

The procedure and processing are analogous to that of Example 31. Electrolyte: 50 ml of 0.1 M tetraoctylammonium bromide in THF. Metal salt: 50 ml of 0.05 M $Mo_2(OAc)_4$ in THF. Charge passed: 480 C. The electrolyte is pressed into a 200 ml nitrogenized vessel and addition of 20 ml of diethyl ether results in the formation of a grey-black precipitate upon vigorous shaking. Product: 265 mg of a black powder. This powder readily dissolves in THF and toluene, and is insoluble in water, diethyl ether, DMF, acetonitrile, and pentane.

Elemental analysis: 37% of molybdenum. Yield 72%. Diameter: 1–5 nm. Electrolyses with $Noct_4Cl$, $Noct_4ClO_4$, $Noct_4PF_6$, $Noct_4BF_4$, Noct4OTf, $Noct_4OTs$, $Poct_4Cl$, or $Poct_4Br$ as the stabilizer proceed in much the same way.

EXAMPLE 35

The procedure and processing are analogous to that of Example 31. Electrolyte: 50 ml of 0.1 M tetrabutylammonium acetate in THF, and 50 ml of 0.1 M tetrabutylammonium chloride in THF. Metal salt: 0.5 g of $RhCl_3.xH_2O$. Charge passed: 700 C. Product: 440 mg of a grey-black powder. This powder readily dissolves in DMF, and is insoluble in water, diethyl ether, THF, acetonitrile, toluene, and pentane.

Elemental analysis: 46% of rhodium. Yield: 92%. Diameter: 2–3 nm. Electrolyses with $RhBr_3.xH_2O$ and $RhCl_3$ proceed in much the same way.

EXAMPLE 36

The procedure and processing are analogous to that of Example 31. Two sheets of pure platinum (4×4 cm² geometric electrode surface area, thickness 0.5 mm) at a distance of about 3 mm are used as the electrodes. Metal salt: 0.5 g of $RuCl_3.H_2O$. By means of jacket cooling, the electrolytic cell is maintained at 18° C. Charge passed: 650 C. Within 24 hours, a grey-black precipitate forms. Product: 290 mg of a grey-black powder. This powder readily dissolves in DMF, and is insoluble in water, diethyl ether, THF, acetonitrile, toluene, and pentane.

Elemental analysis: 55% of ruthenium. Yield: 73%. Diameter: <5 nm. Electrolyses with $RuCl_3$ proceed in much the same way.

EXAMPLE 37

The procedure and processing are analogous to that of Example 31. Two sheets of pure platinum (4×4 cm² geometric electrode surface area, thickness 0.5 mm) at a distance of about 3 mm are used as the electrodes. Metal salt: 0.5 g of $CoBr_2$. By means of jacket cooling, the electrolytic cell is maintained at 18° C. Charge passed: 400 C. The slightly brown clear supernatant is pressed off under inert gas and the precipitate is washed twice with 10 ml of absolute pentane. Product: 250 mg of a grey-black powder. This powder readily dissolves in DMF, and is insoluble in water, diethyl ether, THF, acetonitrile, toluene, and pentane.

Elemental analysis: 44% of cobalt. Yield: 88%. Diameter: <5 nm. Electrolyses with $CoI_2$ proceed in much the same way.

EXAMPLE 38

The procedure and processing are analogous to that of Example 31. Two sheets of pure platinum (4×4 $cm^2$ geometric electrode surface area, thickness 0.5 mm) at a distance of about 3 mm are used as the electrodes. Metal salt: 0.5 g of $NiBr_2$. By means of jacket cooling, the electrolytic cell is maintained at 18° C. Charge passed: 500 C. The slightly brown clear supernatant is pressed off under inert gas and the precipitate is washed twice with 10 ml of absolute pentane. Product: 250 mg of a grey-black powder. This powder readily dissolves in DMF, and is insoluble in water, diethyl ether, THF, acetonitrile, toluene, and pentane.

Elemental analysis: 38% of nickel. Yield: 86%. Diameter: <5 nm. Electrolyses with $NiI_2$ proceed in much the same way.

EXAMPLE 39

The procedure and processing are analogous to that of Example 31. Metal salt: 0.5 g of $OsCl_3$. By means of jacket cooling, the electrolytic cell is maintained at 18° C. Current: 5 mA, increased to 15 inA in the course of 5 minutes. Charge passed: 500 C. Within 24 hours, a grey-black precipitate forms. Product: 360 mg of a grey-black powder. This powder readily dissolves in DMF, and is insoluble in water, diethyl ether, THF, acetonitrile, toluene, and pentane.

Elemental analysis: 62% of osmium. Yield: 69%. Diameter: <3 nm.

EXAMPLE 40

The procedure and processing are analogous to that of Example 31. Electrolyte: 100 ml of 0.05 M tetrabutylammonium acetate in THF. Metal salt: 0.5 g of $Pd(OAc)_2$. Current: 2 mA, increased to 30 mA in the course of 10 minutes. Charge passed: 430 C. Product: 318 mg of a black powder. This powder readily dissolves in DMF, and is insoluble in water, diethyl ether, THF, acetonitrile, toluene, and pentane.

Elemental analysis: 70% of palladium. Yield: 95%. Diameter: 1–5 nm. Electrolyses with Pd(II) trifluoroacetate and Pd(II) trifluoromethanesulfonate proceed in much the same way.

EXAMPLE 41

The procedure and processing are analogous to tLat of Example 31. Metal salt: 0.6 g of $GaBr_3$. Current: 2 mA, increased to 20 mA in the course of 10 minutes. Charge passed: 550 C. Product: 195 mg of a black powder. This powder readily dissolves in DMF, and is insoluble in water, THF, diethyl ether, toluene, acetonitrile, and pentane.

Elemental analysis: 61% of gallium. Yield: 89%. Diameter: <10 nm. Electrolyses with $GaCl_3$ proceed in much the same way.

EXAMPLE 42

In a multi-purpose electrolytic cell for 20–100 ml of electrolyte are charged 100 ml of 0.1 M tetraoctylammonium bromide in THF. Two sheets of pure platinum (1.5×2 $cm^2$ geometric electrode surface area, thickness 0.5 mm) at a distance of about 3 mm are used as the electrodes. All operations must be performed under an inert gas atmosphere (argon or nitrogen). Under ultrasonic action, 0.6 g of $In(OAc)_3$ is dissolved in the electrolyte and a current of 2 mA which is increased to 20 MA in the course of 10 min is passed between the platinum electrodes. By means of jacket cooling, the electrolytic cell is maintained at 20° C. In the course of the electrolysis, the electrolyte turns deep-black. After a charge of 600 C has been passed, the electrolysis is stopped and the electrolyte is pressed into a 200 ml nitrogenized vessel. Addition of 15 ml of oxygen-free water to the electrolyte results in the formation of a grey-black precipitate upon vigorous shaking. After 24 hours, the slightly brown clear supernatant is pressed off under inert gas and the precipitate is washed twice with 10 ml of diethyl ether. Drying under oil pump vacuum for 24 hours yields 380 mg of a black powder. This powder readily dissolves in THF and toluene, and is insoluble in water, diethyl ether, DMF, acetonitrile, and pentane.

Elemental analysis: 55% of indium. This corresponds to an efficiency of 89% with an uptake of 3 electrons per indium ion. Transmission electron micrographs show a size distribution of colloids which are all <10 nm in diameter and have spherical geometries. Electrolyses with $Noct_4Cl$, $Noct_4ClO_4$, $Noct_4PF_6$, $Noct_4BF_4$, $Noct_4OTf$, $Noct_4OTs$, $Poct_4Cl$, or $Poct_4Br$ as the stabilizer proceed in much the same way.

EXAMPLE 43

The procedure and processing are analogous to that of Example 31. Metal salt: 0.5 g of $Tl(OAc)_3$. Charge passed: 370 C. Product: 530 mg of a black powder. This powder readily dissolves in DMF, and is insoluble in water, THF, diethyl ether, toluene, acetonitrile, and pentane.

Elemental analysis: 36% of thallium. Yield: 72%. Diameter: 1–5 nm.

EXAMPLE 44

The procedure and processing are analogous to that of Example 42. Metal salt: 0.5 g of $Pd(OAc)_2$. Charge passed: 430 C. Product: 288 mg of a black powder. This powder readily dissolves in THF and toluene, and is insoluble in water, diethyl ether, DMF, acetonitrile, and pentane.

Elemental analysis: 72% of palladium. Yield: 88%. Diameter: 3–4 nm. Comparative TEM/STM investigations of these colloids (adsorbed from a THF solution, substrate: 200 nm gold on Tempax quartz carrier) clearly show coating of the metal cores with a monomolecular layer of stabilizer. Electrolyses with $Noct_4Cl$, $Noct_4ClO_4$, $Noct_4PF_6$, $Noct_4BF_4$, $Noct_4OTf$, $Noct_4OTs$, $Poct_4Cl$, or $Poct_4Br$ as the stabilizer proceed in much the same way.

EXAMPLE 45

The procedure and processing are analogous to that of Example 42. Electrolyte: 100 ml of 0.1 M tetraoctylammonium bromide in THF/water (10/1). Metal salt: 0.5 g of $PtBr_2$. Charge passed: 270 C. Product: 420 mg of a black powder. This powder readily dissolves in THF and toluene, and is insoluble in water, diethyl ether, DMF, acetonitrile, and pentane.

Elemental analysis: 41% of platinum. Yield: 63%. Diameter: 1–10 nm. Electrolyses with Noct4Cl, Noct$_4$ClO$_4$, Noct$_4$PF$_6$, Noct$_4$BF$_4$, Noct$_4$OTf, Noct$_4$OTs, Poct$_4$Cl, or Poct$_4$Br as the stabilizer proceed in much the same way.

EXAMPLE 46

The procedure and processing are analogous to that of Example 31. Electrolyte: 100 ml of 0.1 M tetrabutylammonium bromide in THF. Metal salt: 0.5 g of Pd(OAc)$_2$. Charge passed: 430 C. Product: 294 mg of a black powder. This powder very readily dissolves in DMF, and is insoluble in water, diethyl ether, THF, acetonitrile, toluene, and pentane.

Elemental analysis: 71% of palladium. Yield: 89%. Diameter: 3–4 nm. Comparative TEM/STM investigations of the!se colloids (adsorbed from a DMF solution, substrate: 200 nm gold on Tempax quartz carrier) clearly show coating of the metal cores with a monomolecular layer of stabilizer. Electrolyses with NBu$_4$Cl, NBu$_4$I, NBu$_4$ClO$_4$, NBU$_4$PF$_6$, NBu$_4$BF$_4$, NBu$_4$OTf, NBu$_4$OTs, PBu$_4$Cl, or PBu$_4$Br as the stabilizer proceed in much the same way.

EXAMPLE 47

In a multi-purpose electrolytic cell for 20–100 ml of electrolyte are charged 100 ml of 0.1 M tetraoctadecylammonium bromide in THF, thermostated at 60° C. Two sheets of pure platinum (1.5×2 cm$^2$ geometric electrode surface area, thickness 0.5 mm) at a distance of about 3 mm are used as the electrodes. All operations must be performed under an inert gas atmosphere (argon or nitrogen). Under ultrasonic action or with vigorous stirring by means of a magnetic stirrer, 0.5 g of Pd(OAc)$_2$ is dissolved in the electrolyte and a current of 2 mA which is increased to 10 mA in the course of 10 min is passed between the platinum electrodes. By means of a jacket heating, the electrolytic cell is maintained at 60° C. in order to keep the stabilizer in solution. In the course of the electrolysis, the electrolyte turns deep-black. After a charge of 430 C has been passed, the electrolysis is stopped and the electrolyte is pressed into a 200 ml nitrogenized vessel. Evaporation of the solvent under oil pump vacuum leaves a black solid. This is dissolved in 100 ml of toluene and 20 ml of an ethanol/water mixture (10/1) is slowly added. Upon vigorous shaking, a grey-black precipitate forms. After 24 hours, the slightly brown clear supernatant is pressed off under inert gas and the precipitate is washed twice with 10 ml of diethyl ether. Drying under oil pump vacuum for 24 hours yields 457 mg of a grey powder. This powder readily dissolves in toluene and pentane, and is insoluble in water, diethyl ether, DMF, THF, and acetonitrile.

Elemental analysis: 34% of palladium. This corresponds to an efficiency of 66% with an uptake of 2 electrons per palladium ion. Transmission electron micrographs show a size distribution of colloids which are all 1–5 nm in diameter and have spherical geometries. Comparative TEM/STM investigations of these colloids (adsorbed from a pentane solution, substrate: 200 nm gold on Tempax quartz carrier) clearly show coating of the metal cores with a monomolecular layer of stabilizer.

EXAMPLE 48

The procedure and processing are analogous to that of Example 31. Electrolyte: 100 ml of 0.1 M tetrabutylammonium butanoate in THF. Metal salt: 0.5 g of PtBr$_2$. Charge passed: 270 C. Product: 316 mg of a grey-black powder. This powder readily dissolves in DMF, and is insoluble in water, diethyl ether, THF, acetonitrile, toluene, and pentane.

Elemental analysis: 79% of platinum. Yield: 91%. Diameter: 1–10 nm. Electrolyses with PtCl$_2$, PtI$_2$, and platinum (II) acetylacetonate proceed in much the same way.

EXAMPLE 49

The procedure and processing are analogous to that of Example 42. Electrolyte: 100 ml of 0.1 M tetraoctylammonium propanoate in THF. Metal salt: 0.5 g of PtCl$_2$. Charge passed: 370 C. Product: 508 mg of a grey-black powder. This powder readily dissolves in THF and toluene, and is insoluble in water, diethyl ether, DMF, acetonitrile, and pentane.

Elemental analysis: 71% of platinum. Yield: 98%. Diameter: 1–10 nm. Electrolyses with PtBr$_2$, PtI$_2$, and platinum (II) acetylacetonate proceed in much the same way.

EXAMPLE 50

The procedure and processing are analogous to that of Example 42. Electrolyte: 100 ml of 0.1 M (–)-N-dodecyl-N-methylephedrinium bromide in THF. Metal salt: 0.5 g of Pd(OAc)$_2$. Charge passed: 430 C. Product: 325 mg of a grey-black powder. This powder readily dissolves in DMF, and is insoluble in water, diethyl ether, THF, acetonitrile, toluene, and pentane.

Elemental analysis: 65% of palladium. Yield: 90%. Diameter: 1–5 nm. NMR spectroscopic studies clearly show the signals of the stabilizer.

EXAMPLE 51

The procedure and processing are analogous to that of Example 42. Electrolyte: 100 ml of 0.1 M benzylbutyldodecyloctylammonium bromide in THF. Metal salt: 0.5 g of Pd(OAc)$_2$. Charge passed: 430 C. Product: 274 mg of a grey-black powder. This powder readily dissolves in THF and toluene, and is insoluble in water, diethyl ether, DMF, acetonitrile, and pentane.

Elemental analysis: 78% of palladium. Yield: 91%. Diameter: 1–5 nm. NMR spectroscopic studies clearly show the signals of the stabilizer. Electrolyses with tributyl(1-methylbenzyl)ammonium bromide as the stabilizer proceed in much the same way.

EXAMPLE 52

The procedure and processing are analogous to that of Example 31. Electrolyte: 100 ml of 0.1 M 3-(dimethyldodecylammonio)propane-sulfonate.LiCl in THF. Metal salt: 0.5 g of Pd(OAc)$_2$. Current: 2 mA, increased to 15 mA in the course of 10 minutes. By means of jacket cooling, the electrolytic cell is maintained at 40° C. Charge passed: 430 C. Product: 402 mg of a grey-black powder. This powder readily dissolves in water, methanol and ethanol, and is insoluble in THF, toluene, diethyl ether, DMF, acetonitrile, and pentane.

Elemental analysis: 52% of palladium. Yield: 89%. Diameter: 1–10 nm. Electrolyses with 3-(N,N-dimethylstearylammonio)propane-sulfonate as the stabilizer proceed in much the same way. Comparative TEM/STM investigations of these colloids (adsorbed from an aqueous solution, substrate: 200 nm gold on Tempax quartz carrier) clearly show coating of the metal cores with a monomolecular layer of stabilizer. Survey of the solubilities of differently stabilized colloids:

| Example | stabilizer | colloid is soluble in |
|---|---|---|
| 52 | (dimethyldodecylammonio)-propanesulfonate | water > ethanol |
| 31 | tetrabutylammonium ... | DMF > THF |
| 34 | tetraoctylammonium ... | THF > toluene |
| 47 | tetraoctadecylammonium ... | pentane > toluene > THF |

EXAMPLE 53

The procedure and processing are analogous to that of Example 52. Electrolyte: 100 ml of 0.1 M 3-(dimethyldodecylammonio)propane-sulfonate.LiOAc in THF. Metal salt: 0.5 g of $RuCl_3.H_2O$. Charge passed: 650 C. Product: 270 mg of a black powder. This powder very readily dissolves in water, and is insoluble in DMF, diethyl ether, THF, acetonitrile, toluene, and pentane.

Elemental analysis: 58% of ruthenium. Yield: 75%. Diameter: 1–2 nm. Comparative TEM/STM investigations of these colloids (adsorbed from an aqueous solution, substrate: 200 nm gold on Tempax quartz carrier) clearly show coating of the metal cores with a monomolecular layer of stabilizer.

EXAMPLE 54

The procedure and processing are analogous to that of Example 31. Electrolyte: 100 ml of 0.05 M tetrabutylammonium bromide in propylene carbonate. Metal salt: 0.5 g of $Pd(OAc)_2$. Charge passed: 430 C. Product: 550 mg of a black powder. This powder very readily dissolves in DMF, and is insoluble in water, diethyl ether, THF, acetonitrile, toluene, and pentane.

Elemental analysis: 41% of palladium. Yield: 96%. Diameter: 1–5 nrm. Electrolyses with $NBu_4Cl$, $NBu_4I$, $NBu_4ClO_4$, $NBu_4PF_6$, $NBu4BF_4$, $NBu_4OTf$, $NBu_4OTs$, $PBu_4Cl$, or $PBu_4Br$ as the stabilizer proceed in much the same way.

EXAMPLE 55

The procedure and processing are analogous to that of Example 31. Electrolyte: 100 ml of 0.05 M tetrabutylammonium bromide in acetonitrile. Metal salt: 0.5 g of $Pd(OAc)_2$. Charge passed: 430 C. Product: 367 mg of a black powder. This powder very readily dissolves in DMF, and is insoluble in water, diethyl ether, THF, acetonitrile, toluene, and pentane.

Elemental analysis: 57% of palladium. Yield: 89%. Diameter: 1–5 nm. Electrolyses with $NBu_4Cl$, $NBu_4I$, $NBu_4ClO_4$, $NBu_4PF_6$, $NBu_4BF_4$, $NBu_4OTf$, $NBu_4OTs$, $PBu_4Cl$, or $PBu_4Br$ as the stabilizer proceed in much the same way.

EXAMPLE 56

The procedure and processing are analogous to that of Example 31. Two sheets of pure platinum (4×4 cm² geometric electrode surface area, thickness 0.5 mm) at a distance of about 3 mm are used as the electrodes. Current: 1 mA. Product: 630 mg of a grey-black powder. This powder readily dissolves in DMF, and is insoluble in water, diethyl ether, THF, acetonitrile, toluene, and pentane.

Elemental analysis: 52% of platinum. Yield: 90%. Diameter: 6–15 nm. As compared to Example 31 and Example 57, electrolysis with low current densities results in larger colloids.

EXAMPLE 57

The procedure and processing are analogous to that of Example 31. Current: 195 mA. Product: 788 mg of a grey-black powder. This powder readily dissolves in DMF, and is insoluble in water, diethyl ether, THF, acetonitrile, toluene, and pentane.

Elemental analysis: 38% of platinum. Yield: 82%. Diameter: <2 nm. As compared to Example 31 and Example 56, electrolysis with high current densities results in smaller colloids.

| Example | current density [mA/cm²] | colloid diameter [nm] |
|---|---|---|
| 56 | 0.06 | 6–15 |
| 31 | 10.00 | 3–5 |
| 57 | 65.00 | <2 |

EXAMPLE 58

In a multi-purpose electrolytic cell for 20–100 ml of electrolyte are charged 100 ml of 0.1 M tetrabutylammonium acetate in THF. 3.5 g of dried and mortar-ground alumina is suspended in this solution as a substrate material. Two sheets of pure platinum (4×4 cm² geometric electrode surface area, thickness 0.5 mm) at a distance of about 3 mm are used as the electrodes. All-operations must be performed under an inert gas atmosphere (argon or nitrogen). With stirring, 0.5 g of $RuCl_3.H_2O$ is dissolved in the electrolyte and a current of 5 mA which is increased to 30 mA in the course of 10 minutes is passed between the platinum electrodes. By means of jacket cooling, the electrolytic cell is maintained at 18° C. In the course of the electrolysis, the electrolyte turns deep-black. After a charge of 635 C has been passed, the electrolysis is stopped. After 2 hours, the supernatant is pressed off under inert gas and the residual solid is washed twice with 20 ml of diethyl ether. Drying under oil pump vacuum for 24 hours yields 3.8 g of a light-grey powder.

Elemental analysis: 3.9% of ruthenium. This corresponds to an efficiency of 68% with an uptake of 3 electrons per ruthenium ion. Transmission electron micrographs show a narrow size distribution of colloids which are all <5 nm in diameter and have spherical geometries. Electrolyses with active charcoal, $SiO_2$, $TiO_2$, $La_2O_3$, $Y_2O_3$, MgO, or Kevlar® as the substrate material proceed in much the same way.

EXAMPLE 59

In a 150 ml nitrogenized vessel, 250 mg of palladium colloid (cf. Example 52, metal content 26%, average size 3–5 nm) is dissolved in 100 ml of oxygen-free water. All operations must be performed under an inert gas atmosphere (argon or nitrogen). With vigorous stirring, 5.0 g of dried and mortar-ground titaniumdioxide is added and stirring is continued for another 50 min. After 2 hours, the solvent is evaporated under oil pump vacuum. Drying under oil pump vacuum for 24 hours yields 5.25 g of a light-grey powder.

Elemental analysis: 1.3% of palladium. Transmission electron micrographs show a narrow size distribution of colloids which are all 3–5 nm in diameter, have spherical geometries and are individually fixed on the substrate. Thus, the same size distribution as prior to substrate fixation is observed. Substrate fixations using active charcoal, $Al_2O_3$, $SiO_2$, $La_2O_3$, $Y_2O_3$, MgO, or Kevlar® as the substrate material proceed in much the same way.

EXAMPLE 60

In a 50 ml nitrogenized vessel, 100 mg of palladium colloid (cf. Example 44, metal content 72%, average size 1–5 nm) is dissolved in 10 ml of THF. All operations must be performed under an inert gas atmosphere (argon or nitrogen). With the use of ultrasonic waves, a solution of 0.5 g of dried poly(p-phenylene-vinylene) in 10 ml of THF is added. After 10 min, the solvent is evaporated under oil pump vacuum. Drying under oil pump vacuum for two hours yields 600 mg of a dark powder.

Elemental analysis: 12% of palladium. The powder thus prepared is very useful for the preparation of films and workpieces. Embeddings using PMMA and polystyrene proceed in much the same way.

EXAMPLE 61

The procedure and processing are analogous to that of Example 31. Metal salts: 0.25 g of $PtCl_2$ and 0.25 g of $RhCl_3.3H_2O$. Charge passed: 530 C. Product: 360 mg of a grey-black powder. This powder readily dissolves in DMF, and is insoluble in water, diethyl ether, THF, acetonitrile, toluene, and pentane.

Elemental analysis: 42% of platinum and 24% of rhodium. Yield: 86%. Diameter: <3 nm. Energy-dispersive x-ray spot analysis (EDX) of individual particles clearly shows that both platinum and rhodium are present in the colloids. Comparative TEM/STM investigations of these colloids (adsorbed from a DMF solution, substrate: 200 nm gold on Tempax quartz carrier) clearly show coating of the metal cores with a monomolecular layer of stabilizer. Electrolyses of platinum from $PtBr_2$, $PtI_2$, platinum(II) acetylacetonate, and of rhodium from $RhCl_3$ and $RhBr_3.xH_2O$ proceed in much the same way.

EXAMPLE 62

The procedure and processing are analogous to that of Example 31. Metal salts: 450 mg of $PtCl_2$ and 50 mg of $RhCl_3.3H_2O$. Charge passed: 400 C. Product: 340 mg of a grey-black powder. This powder readily dissolves in DMF, and is insoluble in water, diethyl ether, THF, acetonitrile, toluene, and pentane.

Elemental analysis: 62% of platinum and 4% rhodium. Yield: 83%. Diameter: <3 nm. Energy-dispersive X-ray spot analysis (EDX) of individual particles clearly shows that both platinum and rhodium are present in the colloids. Electrolyses of platinum from $PtBr_2$, $PtI_2$, platinum(II) acetylacetonate, and of rhodium from $RhCl_3$ and $RhBr_3.xH_2O$ proceed in much the same way.

EXAMPLE 63

In a multi-purpose electrolytic cell for 20–100 ml of electrolyte are charged 100 ml of 0.1 M tetraoctylammonium bromide in THF. The following serve as electrodes: a sheet of pure platinum is used as the cathode and a sheet of pure copper is used as the anode (1.5×2 $cm^2$ geometric electrode surface area, thickness 0.5 mm) at a distance of about 3 mm. All operations must be performed under an inert gas atmosphere (argon or nitrogen). Under ultrasonic action, 0.5 g of $PdBr_2$ is dissolved in the electrolyte and a current of 2 mA which is increased to 20 mA in the course of 10 minutes is passed between the electrodes. By means of jacket cooling, the electrolytic cell is maintained at 20° C. In the course of the electrolysis, the electrolyte turns deepblack. After a charge of 490 C has been passed, the electrolysis is stopped and the electrolyte is pressed into a 200 ml nitrogenized vessel. Addition of 15 ml of oxygen-free water to the electrolyte results in the formation of a greyblack precipitate upon vigorous shaking. After 24 hours, the slightly brown clear supernatant is pressed off under inert gas and the precipitate is washed twice with 10 ml of diethyl ether. Drying under oil pump vacuum for 24 hours yields 570 mg of a black powder. This powder readily dissolves in THF and toluene, and is insoluble in water, diethyl ether, DMF, acetonitrile, and pentane.

Elemental analysis: 35% of palladium and 15% of copper. The remainder is the tetraoctylammonium bromide stabilizer. This corresponds to an efficiency of 97%. Transmission electron micrographs show a size distribution of colloids which are all 1–5 nm in diameter and have spherical geometries. Energy-dispersive X-ray spot analysis (EDX) of individual particles clearly shows that both palladium and copper are present in the colloids. Electrolyses with $Noct_4Cl$, $Noct_4ClO_4$, $Noct_4PF_6$, $Noct_4BF_4$, $Noct_4OTf$, $Noct_4OTs$, $Poct_4Cl$, or $Poct_4Br$ as the stabilizer proceed in much the same way.

EXAMPLE 64

The procedure and processing are analogous to that of Example 63. Metal salt: 0.5 g of $PtCl_2$. Charge passed: 495 C. Product: 675 mg of a black powder. This powder readily dissolves in THF and toluene, and is insoluble in water, diethyl ether, DMF, acetonitrile, and pentane.

Elemental analysis: 53% of platinum and 23% of copper; Yield: 98%. Diameter: 1–5 nm. Energy-dispersive X-ray spot analysis (EDX) of individual particles clearly shows that both platinum and copper are present in the colloids. Electrolyses with $Noct_4Cl$, $Noct_4ClO_4$, $Noct_4PF_6$, $Noct_4BF_4$, $Noct_4OTf$, $Noct_4OTs$, Poct4Cl, or $Poct_4Br$ as the stabilizer proceed in much the same way.

EXAMPLE 65

The procedure and processing are analogous to that of Example 63. Electrolyte: 100 ml of 0.1 M tetrabutylammonium bromide in THF. As electrodes, a sheet of pure platinum is used as the cathode and a tin sheet is used as the anode (1.5×2 $cm^2$ geometric electrode surface area, thickness 0.5 mm) at a distance of about 3 mm. Metal salt: 0.5 g of $PtCl_2$. Charge passed: 800 C. Product: 745 mg of a black powder. This powder readily dissolves in DMF, and is insoluble in water, THF, toluene, diethyl ether, acetonitrile, and pentane.

Elemental analysis: 49% of platinum and 36% of tin. Yield: 98%. Diameter: 3–5 nm. Energy-dispersive X-ray spot analysis (EDX) of individual particles clearly shows that both platinum and tin are present in the colloids. Comparative TEM/STM investigations of these colloids (adsorbed from a DMF solution, substrate: 200 nm gold on Tempax quartz carrier) clearly show coating of the metal cores with a monomolecular layer of stabilizer. Electrolyses with $NBu_4Cl$, $NBu_4I$, $NBu_4ClO_4$, $NBu_4PF_6$, $NBu_4BF_4$, NBu4OTf, $NBu_4OTs$, $PBu_4Cl$, or $PBu_4Br$ as the stabilizer proceed in much the same way.

EXAMPLE 66

In a multi-purpose electrolytic cell for 20–100 ml of electrolyte are charged 90 ml of 0.1 M tetrabutylammonium acetate in THF/water (10/1). 5.0 g of mortar-ground active charcoal is suspended in this solution as a substrate material. Two sheets of pure platinum (1.5×2 $cm^2$ geometric electrode surface area, thickness 0.5 mm) at a distance of about 3 mm are used as the electrodes. All operations must be performed under an inert gas atmosphere (argon or nitrogen). Under ultrasonic action, 0.25 g of $PtCl_2$ and 0.25 g of $RhCl_3.3H_2O$ is dissolved in the electrolyte and a current of 5 mA which is increased to 30 mA in the course of 10 minutes is passed between the platinum electrodes. By means of jacket cooling, the electrolytic cell is maintained at 20° C. In the course of the electrolysis, the electrolyte turns deep-black. After a charge of 530 C has been passed, the electrolysis is stopped and the electrolyte is pressed into a 200 ml nitrogenized vessel. The slightly brown clear supernatant is pressed off under inert gas and the residual solid is washed twice with 10 ml of diethyl ether. Drying under oil pump vacuum for one hour yields 5.36 g of a black powder.

Elemental analysis: 3.1% of platinum and 1.7% of rhodium. This corresponds to an efficiency of 83% with an uptake of 2 electrons per platinum ion and 3 electrons per rhodium ion. Transmission electron micrographs show a narrow size distribution of colloids which are all <3 nm in diameter, have spherical geometries and are individually fixed on the substrate. Energy-dispersive X-ray spot analysis (EDX) of individual particles clearly shows that both platinum and rhodium are present in the colloids. Electrolyses of platinum from $PtBr_2$, $PtI_2$, platinum(II) acetylacetonate, and of rhodium from $RhCl_3$ and $RhBr_3.xH_2O$ proceed in much the same way.

EXAMPLE 67

In a miniautoclave, 85 mg of palladium on active charcoal (similar to Example 59, metal content 5%) are suspended in 20 ml of DMF. After 2 mmol of bromobenzene, 2 mmol of styrene, and 4 mmol of tetrabutylammonium acetate have been added, heating at 120° C. is performed with shaking. After 16 h, 267 mg of stilbene can be isolated from the reaction solution. This corresponds to a 74% conversion.

EXAMPLE 68

In a miniautoclave, 25 mg of rhodium colloid (similar to Example 45, metal content 38%) are dissolved in 20 ml of THF. After 5 mmol of cyclohexene has been added, the vessel is exposed to an atmosphere of hydrogen (1 bar) with shaking at 20° C. After 1 h, hydration is complete, and in the gas chromatogram of the reaction solution, cyclohexane and THF can be solely detected. This corresponds to a 100% conversion.

EXAMPLE 69

In an autoclave, 150 mg of ruthenium/alumina catalyst (similar to Example 58, metal content 3.9%) is suspended in 25 ml of benzene and 5 ml of water. Then, the suspension is heated at 145° C and pressurized with hydrogen (total pressure 50 bar) with stirring. After 25 min, the gas chromatogram shows a product distribution of 31% of cyclohexene and 69% of cyclohexane.

EXAMPLE 70

In a multi-purpose electrolytic cell for 20–100 ml of electrolyte, 10 mg of palladium colloid (cf. Example 32, metal content 62%) is dissolved in 20 ml of DMF. As electrodes, a sheet of pure platinum is used as the cathode and a piece of freshly drawn graphite (HOPG) is used as the anode (1×1 $cm^2$ geometric electrode surface area) at a distance of about 6 mm. All operations must be performed under an inert gas atmosphere (argon or nitrogen). For 30 seconds, a voltage of 30 volts is applied between the electrodes. Subsequently, the graphite electrode is removed and washed twice with 3 ml of diethyl ether.

Scanning force microscopic studies clearly show covering of the surface with the colloid.

EXAMPLE 71

In a 2 ml plastic vessel, 160 µl of 0.1 M aqueous sodium fluoride is added with stirring to 4 mmol of $Mg(OEt)_2$, 1 mmol of methyl-trimethoxysilane, 1 mg of palladium colloid (metal content 44%), and 200 µl of THF. After drying at 50° C. for 24 hours, remaining volatile components are removed under oil pump vacuum for another 24 hours. Then, the mortar-ground residue in ethanol is refluxed for 24 hours. After decantation, the solid is dried under oil pump vacuum.

Elemental analysis: 0.1% of palladium.

EXAMPLE 72

In a 60 ml miniautoclave, 85 mg of palladium in sol-gel matrix (cf. Example 71, metal content 0.1%) are suspended in 20 ml of DMF. After 2 mmol of iodobenzene, 2 mmol of styrene, and 4 mmol of tetrabutylammonium acetate have been added, heating at 60° C. is performed with shaking. After 12 h, 288 mg of stilbene can be isolated from the reaction solution. This corresponds to an 80% yield.

EXAMPLE 73

The procedure and processing are analogous to that of Example 31. Two sheets of pure platinum (4×4 $cm^2$ geometric electrode surface area, thickness 0.5 mm) at a distance of about 3 mm are used as the electrodes. Metal salt: 0.5 g of $YCl_3$. By means of jacket cooling, the electrolytic cell is maintained at 18° C. Charge passed: 750 C. Within 24 hours, a grey-black precipitate forms. Product: 420 mg of a grey-black powder. This powder readily dissolves in DMF, and is insoluble in diethyl ether, THF, acetonitrile, toluene, and pentane.

Elemental analysis: 22% of yttrium. Yield: 40%. Diameter: <5 nm.

EXAMPLE 74

The procedure and processing are analogous to that of Example 31. Two sheets of pure platinum (4×4 $cm^2$ geometric electrode surface area, thickness 0.5 mm) at a distance of about 3 mm are used as the electrodes. Metal salt: 0.5 g of $ZrCl_4$. By means of jacket cooling, the electrolytic cell is maintained at 18° C. Charge passed: 825 C. Within 24 hours, a grey-black precipitate forms. Product: 244 mg of a grey-black powder. This powder readily dissolves in DMF, and is insoluble in diethyl ether, THF, acetonitrile, toluene, and pentane.

Elemental analysis: 36% of zirconium. Yield: 45%. Diameter: <3 nm.

EXAMPLE 75

The procedure and processing are analogous to that of Example 31. Two sheets of pure platinum (4×4 $cm^2$ geometric electrode surface area, thickness 0.5 mm) at a distance of about 3 mm are used as the electrodes. Metal salt: 0.5 g of $NbBr_5$. By means of jacket cooling, the electrolytic cell is maintained at 18° C. Charge passed: 500 C. Within 24 hours, a grey-black precipitate forms. Product: 114 mg of a grey-black powder. This powder readily dissolves in DMF, and is insoluble in water, diethyl ether, THF, acetonitrile, toluene, and pentane.

Elemental analysis: 50% of niobium. Yield: 60%. Diameter: 1–3 nm.

EXAMPLE 76

The procedure and processing are analogous to that of Example 31. Two sheets of pure platinum (4×4 $cm^2$ geometric electrode surface area, thickness 0.5 mm) at a distance of about 3 mm are used as the electrodes. Metal salt: 0.5 g of $ReCl_3$. By means of jacket cooling, the electrolytic cell is maintained at 18° C. Charge passed: 500 C. Within 24 hours, a grey-black precipitate forms. Product: 423 mg of a grey-black powder. This powder readily dissolves in DMF, and is insoluble in water, diethyl ether, THF, acetonitrile, toluene, and pentane.

Elemental analysis: 55% of rhenium. Yield: 73%. Diameter: <5 nm.

EXAMPLE 77

The procedure and processing are analogous to that of Example 31. Two sheets of pure platinum (4×4 cm² geometric electrode surface area, thickness 0.5 mm) at a distance of about 3 mm are used as the electrodes. Metal salt: 0.5 g of $YbCl_3$. By means of jacket cooling, the electrolytic cell is maintained at 18° C. Charge passed: 550 C. Within 24 hours, a grey-black precipitate forms. Product: 400 mg of a grey-black powder. This powder readily dissolves in DMF, and is insoluble in diethyl ether, THF, acetonitrile, toluene, and pentane.

Elemental analysis: 24% of ytterbium. Yield: 31%. Diameter: <5 nm.

EXAMPLE 78

The procedure and processing are analogous to that of Example 31. Two sheets of pure platinum (4×4 cm² geometric electrode surface area, thickness 0.5 mm) at a distance of about 3 mm are used as the electrodes. Metal salt: 0.5 g of $UBr_3$. By means of jacket cooling, the electrolytic -cell is maintained at 18° C. Charge passed: 300 C. Within 24 hours, a grey-black precipitate forms. Product: 425 mg of a grey-black powder. This powder readily dissolves in DMF, and is insoluble in water, diethyl ether, THF, acetonitrile, toluene, and pentane.

Elemental analysis: 36% of uranium. Yield: 61%. Diameter: <3 nm.

EXAMPLE 79

The procedure and processing are analogous to that of Example 31. Two sheets of pure platinum (4×4 cm² geometric electrode surface area, thickness 0.5 mm) at a distance of about 3 mm are used as the electrodes. Metal salt: 0.5 g of $CdBr_2$. By means of jacket cooling, the electrolytic cell is maintained at 18° C. Charge passed: 350 C. Within 24 hours, a grey-black precipitate forms. Product: 260 mg of a grey-black powder. This powder readily dissolves in DMF, and is insoluble in water, diethyl ether, THF, acetonitrile, toluene, and pentane.

Elemental analysis: 72% of cadmium. Yield: 91%, Diameter: 2–10 nm.

EXAMPLE 80

The procedure and processing are analogous to that of Example 31. Metal salt: 0.5 g of $Bi(OAc)_3$. Charge passed: 400 C. Product: 223 mg of a black powder. This powder readily dissolves in DMF, and is insoluble in water, THF, diethyl ether, toluene, acetonitrile, and pentane.

Elemental analysis: 68% of bismuth. Yield: 56%. Diameter: 5–10 nm.

EXAMPLE 81

The procedure and processings are analogous to that of Example 31. Electrolyte 100 ml of 0.1 M 3-(dimethyldodecylammonio)propanesulfonate in water. Metal salt: 0.5 g $Pd(OPc)_2$. Current 10 mA, increased to 50 mA in the course of 10 minutes. Charge passed: 430 C. The solvent is evaporated under oil pump vacuum and the residue is washed twice with a mixture of thanol/ether (1:10). Drying under oil pump vacuum for 24 hours yields 548 mg of a light-grey powder.

Elemental analysis: 39% palladium. Transmission electron micrographs show a narrow size distribution of colloids which are all <10 nm in diameter.

EXAMPLE 82

The procedure and processings are analogous to that of Example 81. Metal salt: 0.5 g $PtCl_2$. Charge passed: 365 C. The solvent is evaporated under oil pump vacuum and the residue is washed twice with a mixture of ethanol/ether (1:10). Drying under oil pump vacuum for 24 hours yields 720 mg of a light-grey powder.

Elemental analysis: 46% platinum. Transmission electron micrographs show a narrow size distribution of colloids which are all <10 nm diameter.

EXAMPLE 83

In a 150 ml vessel, 100 mg of palladium colloid (cf. Example 52, metal content 57%, average size 3–5 nm) is dissolved in 100 ml of water. With vigorous stirring 5.0 g mortar ground alumina is added and stirring is continued for another 3 hours. After 30 min th colorless supernatant is syphoned off. Drying under oil pump vacuum for 24 hours yields 5.1 g of a light-grey powder.

Elemental analysis: 1.1% palladium. Transmission electron mircographs show a narrow size distribution of colloids which are all 3–5 nm in diameter, have spherical geometries and are individually fixed on the substrate. These supported palladium clusters are embedded in carbon by means of glow evaporation. Ultramicrotome sections of this material show that the metal colloid is only on the surface of the alumina grains.

EXAMPLE 84

In a 150 ml vessel, 150 mg of palladium colloid (cf. Example 52, metal content 57%, average size 3–5 nm) is dissolved in 100 ml of water. With vigorous stirring 3.0 g mortar ground carbon black (Vulcan® XC-72) is added and stirring is continued for another 3 hours. After 30 min the colorless supernatant is syphoned off. Drying under oil pump vacuum for 24 hours yields 3.15 g of a black powder.

Elemental analysis: 2.7% palladium. Transmission electron mircographs show a narrow size distribution of colloids which are all 3–5 nm in diameter, have spherical geometries and are individually fixed on the substrate. Thus, the same size distribution as prior to substrate fixation is observed. Substrate fixations using $Al_2O_3$, $TiO_2$, $SiO_2$, $La_2O_3$, $Y_2O_3$, MgO or Kevlar® as the substrate material proceed in much the same way.

EXAMPLE 85

In a 50 ml vessel, 15 mg of palladium colloid (cf. Example 52, metal content 57%, average size 3–5 nm) is dissolved in 100 ml of water. With, vigorous shaking 250 mg Bioran® controlled pore glas (pore diameter 101 nm, particle size 130–250 $\mu$m) is added and shaking is continued for another 3 hours. After 30 min the colorless supernatant is filtered off. Drying of the residue under oil pump vacuum for 24 hours yields 264 mg of a grey material.

Elemental analysis: 3.2% palladium. Transmission electron micrographs show a narrow size distribution of colloids which are all 3–5 nm in diameter, have spherical geometries and are individually fixed on the substrate. Thus, the same size distribution as prior to substrate fixation is observed. Substrate fixations using Siran® as the substrate material proceed in much the same way.

We claim:

1. A metal, bimetal or multimetal colloid comprising a metal of group Ib, IIb, III, IV, V, VI, VIIb, VIII, lanthanoides, or actinoides of the periodic table, said colloid being soluble in water, said colloid comprising metal particles of a size up to 30 nm, and said colloid being stabilized by a water-soluble stabilizer.

2. A metal, bimetal or multimetal colloid according to claim 1, wherein the water-soluble stabilizer is a betainic stabilizer.

3. A metal, bimetal or multimetal colloid according to claim 2, wherein the betainic stabilizer is selected from the group consisting of those of the formula $(CH_3)_2N^+(C_{12}H_{25})CH_2CH_2CH_2SO_3^-$, $(CH_3)_2N^+(C_{12}H_{25})(CH_2)_xCO_2^-$ (where x=1–3) and cocamidopropyl betaines.

4. A metal, bimetal or multimetal colloid according to claim 1, wherein the water-soluble stabilizer is selected from the group consisting of cationic, anionic, betainic and non-ionic stabilizers.

5. A coated substrate comprising an inert material coated on a surface thereof with a metal, bimetal or multimetal colloid according to claim 1 or 4.

6. A coated substrate according to claim 5, wherein the inert material is selected from the group consisting of carbon blacks, active charcoals, glasses, inorganic oxides and organic polymers.

7. A coated substrate according to claim 6, wherein the inert material is coated on a surface thereof with said metal, bimetal or multimetal colloid in the form of a monomolecular, bimolecular or multimolecular layer of said metal, bimetal or multimetal colloid.

8. In an organic synthetic process comprising the step of reacting one or more reactants in the presence of a catalyst on a substrate, wherein the improvement comprises using as the catalyst a coated substrate according to claim 7.

9. In an organic synthetic process comprising the step of reacting one or more reactants in the presence of a catalyst on a substrate, wherein the improvement comprises using as the catalyst a coated substrate according to claim 6.

10. A coated substrate according to claim 5, wherein the inert material is coated on a surface thereof with said metal, bimetal or multimetal colloid in the form of a monomolecular, bimolecular or multimolecular layer of said metal, bimetal or multimetal colloid.

11. In an organic synthetic process comprising the step of reacting one or more reactants in the presence of a catalyst on a substrate, wherein the improvement comprises using as the catalyst a coated substrate according to claim 10.

12. In an organic synthetic process comprising the step of reacting one or more reactants in the presence of a catalyst on a substrate, wherein the improvement comprises using as the catalyst a coated substrate according to claim 5.

13. A metal, bimetal or multimetal colloid comprising a metal of group Ib, IIb, III, IV, V, VI, VIIb, VIII, lanthanoides, or actinoides of the periodic table, said colloid being soluble or redispersible in organic media, said colloid comprising metal particles of a size <30 nm, and said colloid being stabilized by a quaternary ammonium salt of the formula:

$R^1R^2R^3R^4N^+X^-$ or a quaternary phosphonium salt of the formula:

$R^1R^2R^3R^4P^+X^-$ in which $R^1$, $R^2$, $R^3$ and $R^4$ independently represent at least one member selected from the group consisting of $C_{1-18}$-alkyl, $C_{1-18}$-alkylphenyl and aryl; and X represents at least one member selected from the group consisting of Cl, Br, I, $PF_6$, R'—COO— and $R^1SO_3$.

14. A coated substrate comprising an inert material coated on a surface thereof with a metal, bimetal or multimetal colloid according to claim 13.

15. A coated substrate according to claim 14, wherein the inert material is selected from the group consisting of carbon blacks, active charcoals, glasses, inorganic oxides and organic polymers.

16. A coated substrate according to claim 15, wherein the inert material is coated on a surface thereof with said metal, bimetal or multimetal colloid in the form of a monomolecular, bimolecular or multimolecular layer of said metal, bimetal or multimetal colloid.

17. In an organic synthetic process comprising the step of reacting one or more reactants in the presence of a catalyst on a substrate, wherein the improvement comprises using as the catalyst a coated substrate according to claim 16.

18. In an organic synthetic process comprising the step of reacting one or more reactants in the presence of a catalyst on a substrate, wherein the improvement comprises using as the catalyst a coated substrate according to claim 15.

19. A coated substrate according to claim 14, wherein the inert material is coated on a surface thereof with said metal, bimetal or multimetal colloid in the form of a monomolecular, bimolecular or multimolecular layer of said metal, bimetal or multimetal colloid.

20. In an organic synthetic process comprising the step of reacting one or more reactants in the presence of a catalyst on a substrate, wherein the improvement comprises using as the catalyst a coated substrate according to claim 19.

21. In an organic synthetic process comprising the step of reacting one or more reactants in the presence of a catalyst on a substrate, wherein the improvement comprises using as the catalyst a coated substrate according to claim 14.

22. A method for preparing a coated substrate according to claim 14 comprising:

a) cathodically reducing in an organic solvent optionally comprising water at a temperature of from −78° C. to +120° C. at least one salt of at least one metal of group Ib, IIb, III, IV, V, VI, VIIb, VIII, lanthanoides, or actinoides of the periodic table in the presence of a stabilizer comprising a quaternary ammonium salt of the formula:

$R^1R^2R^3R^4N^+X^-$ or a quaternary phosphonium salt of the formula:

$R^1R^2R^3R^4P^+X^-$ in which $R^1$, $R^2$, $R^3$ and $R^4$ independently represent at least one member selected from the group consisting of $C_{1-18}$-alkyl, $C_{1-18}$-alkylphenyl and aryl; and X represents at least one member selected from the group consisting of Cl, Br, I, $PF_6$, $R^1$—COO— and $R^1SO_3$;

to form a colloid having a particle size <30 nm;

b) recovering said colloid from said organic solvent;

c) forming a solution of said colloid in a solvent;

d) applying said solution to a surface of an inert material so that said colloid becomes adsorbed on the surface of said inert material; and e) removing the solvent.

23. A method according to claim 22, further comprising immobilization of said colloids by a process comprising hydrolysis and/or polymerization of tetraalkoxysiloxanes, alkyltrialkoxysilanes, magnesium alkoxylates, and/or mixtures thereof by sol-gel process in the presence of said colloids.

24. A method according to claim 22, further comprising immobilization of said colloids by a process comprising polymerization of monomers in the presence of said colloids.

25. In an electroless plating method comprising the step of immersing an object in a solution comprising a metal, wherein the improvement comprises using as the solution comprising a metal a solution comprising a metal, bimetal or multimetal colloid according to claim 13 in a concentration of at least one mole of metal per liter of solution.

* * * * *